(12) United States Patent
Stone et al.

(10) Patent No.: US 8,209,236 B2
(45) Date of Patent: Jun. 26, 2012

(54) MERCHANDISE TRACKING AND ORDERING SYSTEM

(75) Inventors: Rebecca Lynn Stone, Riverside, CA (US); Natalie Ziegler, Rolling Hills, CA (US); Michael Ziegler, Rolling Hills, CA (US)

(73) Assignee: ICI Worldwide, Inc., San Dimas, CA (US)

( * ) Notice: Subject to any disclaimer, the term of this patent is extended or adjusted under 35 U.S.C. 154(b) by 1520 days.

(21) Appl. No.: 11/680,146

(22) Filed: Feb. 28, 2007

(65) Prior Publication Data

US 2007/0203803 A1 Aug. 30, 2007

Related U.S. Application Data

(60) Provisional application No. 60/777,977, filed on Feb. 28, 2006.

(51) Int. Cl.
*G06Q 30/00* (2012.01)

(52) U.S. Cl. .................. 705/26.41; 705/26.1; 705/26.4; 705/28; 705/29

(58) Field of Classification Search ......... 705/26.1–27.2
See application file for complete search history.

(56) References Cited

U.S. PATENT DOCUMENTS

| | | | | |
|---|---|---|---|---|
| 6,742,125 | B1 * | 5/2004 | Gabber et al. | 726/4 |
| 7,272,579 | B1 * | 9/2007 | Canali et al. | 705/37 |
| 7,653,583 | B1 * | 1/2010 | Leeb et al. | 705/37 |
| 2002/0194089 | A1 * | 12/2002 | Clifton et al. | 705/26 |
| 2003/0033239 | A1 * | 2/2003 | Gilbert et al. | 705/37 |
| 2007/0100711 | A1 * | 5/2007 | Stroh | 705/28 |
| 2008/0091577 | A1 * | 4/2008 | Holmes et al. | 705/30 |
| 2011/0112945 | A1 * | 5/2011 | Cullen et al. | 705/34 |

OTHER PUBLICATIONS

"Cargo Insurance Is Changing, But American Traders Still Missing the Boat" Richard Barovick. World Trade. Troy: Dec. 2004: vol. 17, Iss. 12, p. 52. Retrieved via ProQuest on Apr. 10, 2012.*

* cited by examiner

*Primary Examiner* — Michael Misiaszek
(74) *Attorney, Agent, or Firm* — Kelly & Kelley, LLP

(57) ABSTRACT

A system, typically offered in electronic network such as the Internet, automates the supply chain business process and provides functionality for vendors to quote items and for the retailer to review and approve quotations. The system sends purchase orders to vendors for review and approval, and tracks goods received and manages invoices and payments.

49 Claims, 26 Drawing Sheets

MERCHANDISE TRACKING AND ORDERING SYSTEM

BACKGROUND OF THE INVENTION

The present invention generally relates to a supply chain business process. More particularly, the present invention concerns an automated system for such supply chain businesses which involve retailers, import consulting firms and suppliers.

Many goods sold in one country are manufactured and transported or exported to another country. Such is the case in the United States, wherein many goods are imported from other nations, such as Asian nations. This has to do with many factors, including the cost of labor, raw materials, etc., which are cheaper in the foreign country.

In the past, a retailer interested in purchasing products from the overseas manufacturer or vendor would either have to know of the manufacturer and vendor and contact them directly, or work with an import consulting firm. The import consulting firm would receive a request from the retailer, and match the overseas vendor or manufacturer that produced the item or was capable of producing the item with the retailer. The quotations were facsimiled or mailed to the import consulting firm by the vendor or manufacturer. The data from the quotations were then entered into spread sheets and the like which were then sent to the retailer, who typically manually entered their output into the retailer's quotation system.

The retailer would then issue purchase orders to the vendors, which were processed by the import consulting firm, and then sent via facsimile or electronic mail to the vendors. The import consulting firm would then typically work with the vendors, such as by telephone and electronic mail, to resolve any issues until the vendors confirm their purchase orders, either verbally or by electronic mail. The accounting department would then typically manually enter banking information and online applications for letters of credit (LC) and Telegraphic Transfers (TT), and manually process the payments against them. The import consulting firm would regularly have to contact the overseas vendor or manufacturer to confirm that the manufacturing and supply process was being performed in a timely manner and that the shipments would conform to prior-set schedules. This overall process is sometimes referred to as a "supply chain" business process. Working with an import consulting firm can be very important, if not critical, to the retailer in order to ensure that the desired goods are manufactured to specification, are purchased at a good and fair price, and that the shipments are timely.

However, there are many problems associated with this "supply chain" process. The quotation data, as indicated above, is manually entered numerous times, once by the vendor, again by the import consulting firm, and finally by the retailer. Due to the multiple manual entry, errors are common, resulting in substantial delays, increased costs, and labor to resolve. Communication with vendors and manufacturers (many of whom are located in Asian countries, such as China) in confirming purchase orders often result in substantial delays. The very fact that the entire supply chain process has been manual, rendered it very labor intensive, particularly for the import consulting firm.

Accordingly, there is a continuing need for an electronic system which automates, to a large extent or completely, the supply chain business process involving retailers, import consulting firms and overseas suppliers. The present invention fulfills this need, and provides other related advantages.

SUMMARY OF THE INVENTION

The present invention is an on-line software application which automates the supply chain business process between overseas vendors, an importation consulting firm (importer), and a retailer (customer). Automating this process dramatically reduces the administrative labor required with past methodologies, improves the speed of work flow among the parties, and reduce the costly errors inherent in the prior art processes.

The process generally comprises the step of providing an on-line merchandise quotation, confirmation and tracking system. A vendor registers with the system and supplies vendor contact data, vendor bank data, and the like. The vendor logs into the system and creates a quotation for an item by adding quotation data to pre-established fields within the system. The quotation data includes item packaging information, item shipping information, item duty schedule information, number of items per carton information, number of item minimum purchase information, single or assortment information, pricing information, and preferably and item graphic or photograph. Once all of the quotation and data has been entered, the system displays the quotation data for the vendor to review. The vendor may revise the quotation data as needed, and approves, saves and submits the quotation data to the system.

The system then determines if all of the required quotation fields have been properly completed. The status of the quotation is then changed from "unquoted" to "quoted" after the vendor has approved and submitted the quotation and the system has verified that all of the minimum required fields have been completed.

The importer logs into the system and review each quoted quotation of the vendor. Typically, when the importer logs into the system, a plurality of programs and related vendors having links are provided, the clicking on a link moving the importer to pages having data for each of the programs and/or vendors. As used herein, a program refers to an importation program, meaning that a program may have more than one item at issue, and possibly even more than one vendor at issue. The importer then determines whether to change the vendor quotation, present the quotation to a customer without changes, or finalize the vendor quotation. The importer may negotiate item price with the vendor after the quotation has been submitted to the system.

A customer, who has previously registered with the system, logs on and reviews importer finalized or presented quotations for each vendor and item relating to the customer. The customer determines whether to reject or accept the quotation, request a requote, pre-select a quotation, or select a quotation. The system of the present invention permits the customer to add customer internal data, including advertisement data, for each quoted item. The customer can also download or print information from the quotation, including graphics or photographs, that can be used by the customer, such as advertising or marketing materials.

Once the customer accepts a quotation, the customer creates a purchase order. The system compares that data within the purchase order to the quotation data previously entered into the system to determine if discrepancies exist between the purchase order and the quotation data entered into the system. If there are discrepancies between the purchase order and the quotation data pertaining to the item within the system, the importer and/or the customer are notified of the discrepancies. The customer is permitted to review and revise the purchase order to eliminate the detected discrepancies. The purchase order is assigned a purchase order number once the purchase order has been approved. The purchase order is stored within the system, and the vendor is notified of the purchase order. Once the vendor logs in and selects the program or purchase order, a purchase order summary is displayed for the vendor. The vendor then confirms or cancels the purchase order. The confirming or canceling step includes the steps of reviewing the purchase order for each item line by line, and confirming the purchase order, requesting a change to one or more lines of the purchase order, or canceling the ordered item. Further steps, such as confirming carton marks, determining that all banking information is complete, and confirming that all quotes are correct are also usually taken. In the event that the vendor requests a change to one or more lines of a purchase order, the importer and/or the customer are notified of the requested change by the vendor. The importer and/or customer can accept or reject the requested changes, and the acceptance or rejection is relayed to the vendor.

A summary of the data entered into the system relating to a program associated with a particular item, or a particular item itself, may be displayed to either the vendor, importer, or customer upon request. Thus, all of the pertinent data pertaining to the item or program can be viewed simultaneously, the vendor, importer, or customer can determine the status of the information and the program at any given time.

The importer typically enters warehouse estimates, including estimating the quantity to be ordered for distribution center of the item. The importer typically also assigns each item a harmonized tariff schedule code. Typically, the customer reviews the harmonized tariff schedule code assigned by the importer, and accepts it or signs a new harmonized tariff schedule code. As it is the customer who is responsible for such codes, the customer is able to lock the assigned codes from further adjustment.

The confirmed purchase order data is then forwarded to a freight forwarder. The system calculates a ship date, and establishes at least one notification date related to the calculated ship date. The system periodically creates a purchase order status, such as the importer and customer can view the status of the order. Depending upon the order status, the importer and/or customer can determine if the purchase order should be revised, or cancelled. The system tracks the at least one notification date, and sends an inquiry to the vendor on the at least one notification date requesting a status of the order and confirmation of the shipping date. The system notifies the importer in the event the vendor fails to send an order status within a maximum prescribed time.

This system notifies the importer of shipment delivery to the freight forwarder automatically when the vendor's shipping documents are received by the system. The importer enters into the system invoice data, including the number of cartons, case weight, case cube, actual ship date, and approval or rejection of inspection certificate after the purchase order has been accepted by the vendor. It is determined that the item quantity has been delivered.

The importer creates and forwards vendor payment documentation to the customer. The vendor payment documentation typically includes purchase order data, total dollar amounts, and either a wire transfer request form or a letters credit cover letter. Actual payments made to the vendor are tracked.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

The present invention is an on-line software application which automates the supply chain business process of obtaining quotations from vendors, typically situated overseas, for a retailer. The system of the present invention automates the supply chain business process between a retailer (customer), an import consulting firm (importer), and the overseas supplier. It will be appreciated by those skilled in the art that automating this process dramatically reduces the administrative labor required, improves the speed of work load among the parties, and reduces the costly errors inherent in the manual methodologies which have been used in the past.

As will be more fully described herein, the system, which is typically offered in electronic network such as the Internet, provides functionality for vendors to quote items and the retailer or customer to review and approve quotations. The system also sends purchase orders to vendors for review and approval. The system further tracks goods ordered and received and manages invoices and payments. The system also allows both the importer and customer to work together on creating harmonized tariff schedules. Checks and balances are provided at each step, ensuring that a minimum required amount of information is conveyed between each of the parties. Moreover, the retailer or customer can import information, such as photographs, graphics, etc. for marketing and advertising purposes.

Figure 1:
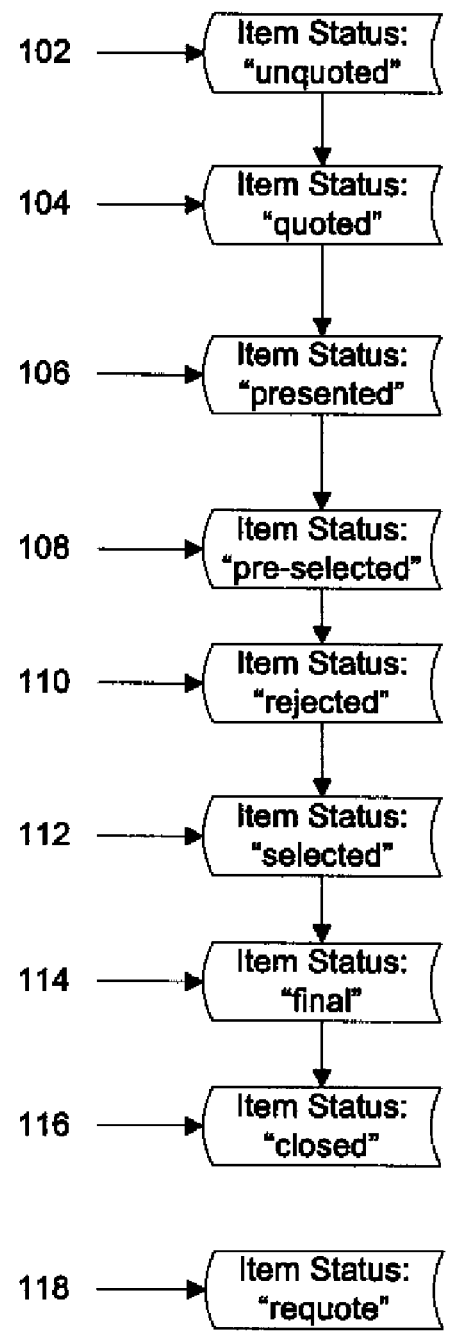
FIG. 1 is a flowchart illustrating the steps representing the entire life cycle of a quotation, through a series of statuses, in accordance with the present invention.

With reference now to FIG. 1, the entire life cycle of a quotation is shown through a series of statuses. If the item status is "unquoted" (102) this is the default status for an item, that indicates that the item is open for editing by the vendor and has never been submitted.

If the item status is "quoted" (104), this indicates that the item is closed to editing by the vendor and open to review by the importing consulting company (sometimes referred to herein as importer).

If the item status is "presented" (106), this indicates that the item is closed for review by the importer and is open for review by the customer or retailer.

If the item status is "pre-selected" (108), the customer has reviewed and pre-selected this item and is open to status change by the customer unless the program is marked as closed.

If the item status is "rejected" (110), the item has been rejected by the customer and the item is open to status change by the customer unless the program is marked closed.

If the item status is "selected" (112), the item is closed to review by the customer but is open for review by the importer.

If the item status is "final" (114), the item is closed from review by the importer.

If the item status is "closed" (116), the program is closed. The importer may open the item for review, but any item changes must be e-mailed to the customer.

If the item status is "requote" (118), the item is open for editing by the vendor and has been submitted as quoted previously. This status is initiated by either the customer or the importer.

As will be appreciated by those skilled in the art, in a typical scenario, the importing consulting agency (importer) serves as an intermediary and assistant to both the manufacturer or supplier and the retailer or customer. In some cases, the importer will have contacts with vendors who offer products. These vendors can post these products on the on-line system of the present invention, and when a customer or retailer is interested in purchasing such products, the importer can supply this information to the customer. More frequently, however, the importer has been contacted by the customer with a request to obtain certain items. The importer then contacts one or more vendors who either make such an item or are capable of making such an item, and these vendors provide information and price quotes as to the product. This information is reviewed, and forwarded onto the customer for approval or suggested changes or concerns.

Figure 2A:
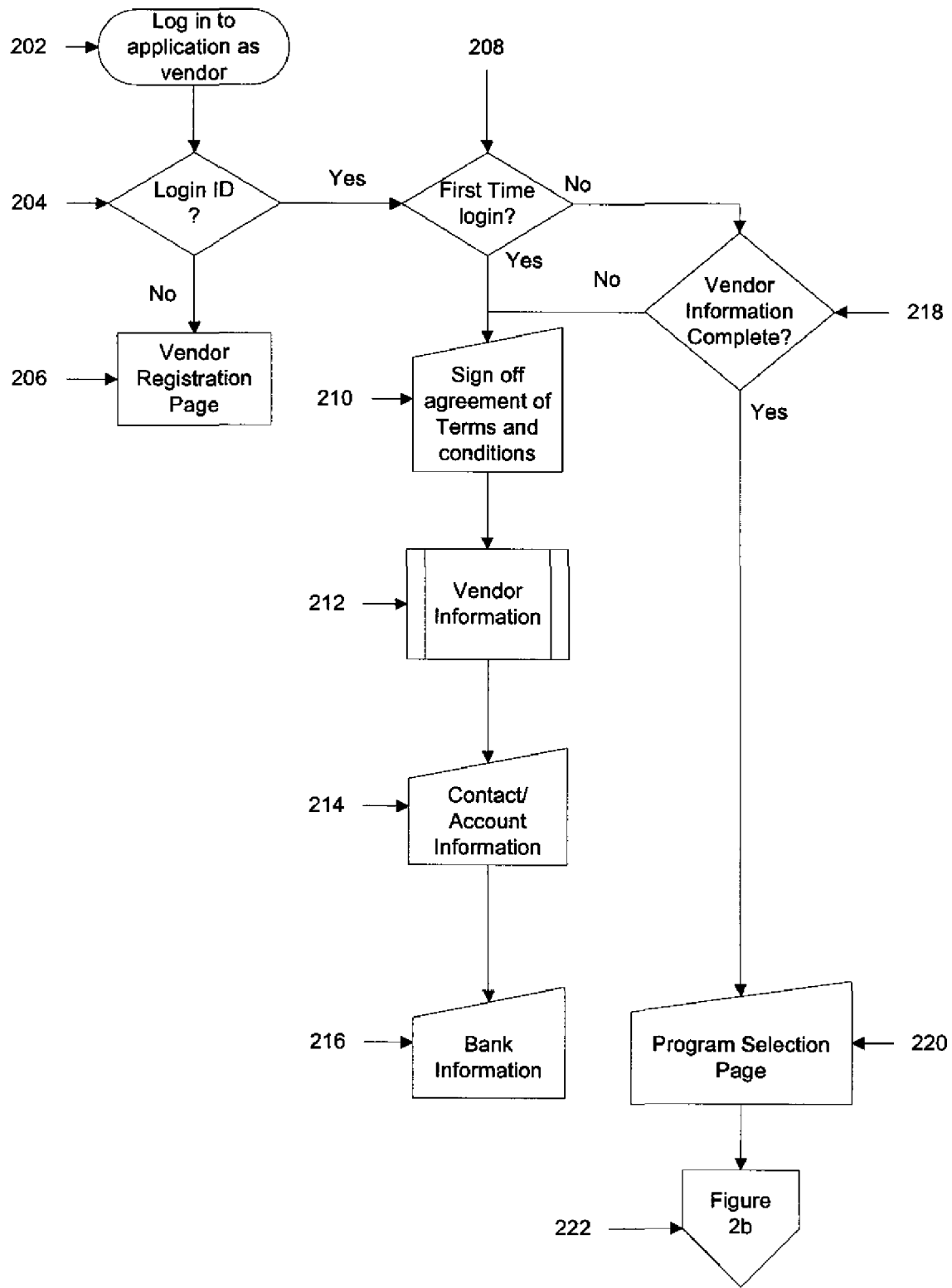
FIG. 2a-2c are flowcharts illustrating the steps taken for a vendor quotation, in accordance with the present invention.
Figure 2B:
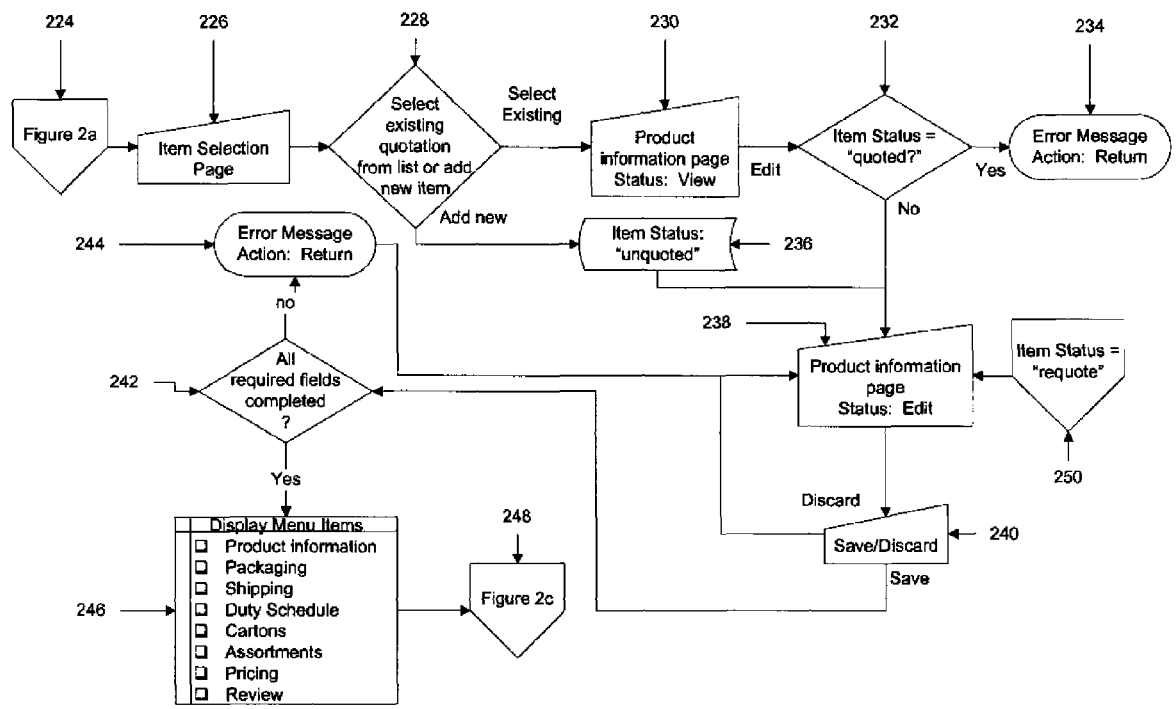
Figure 2C:
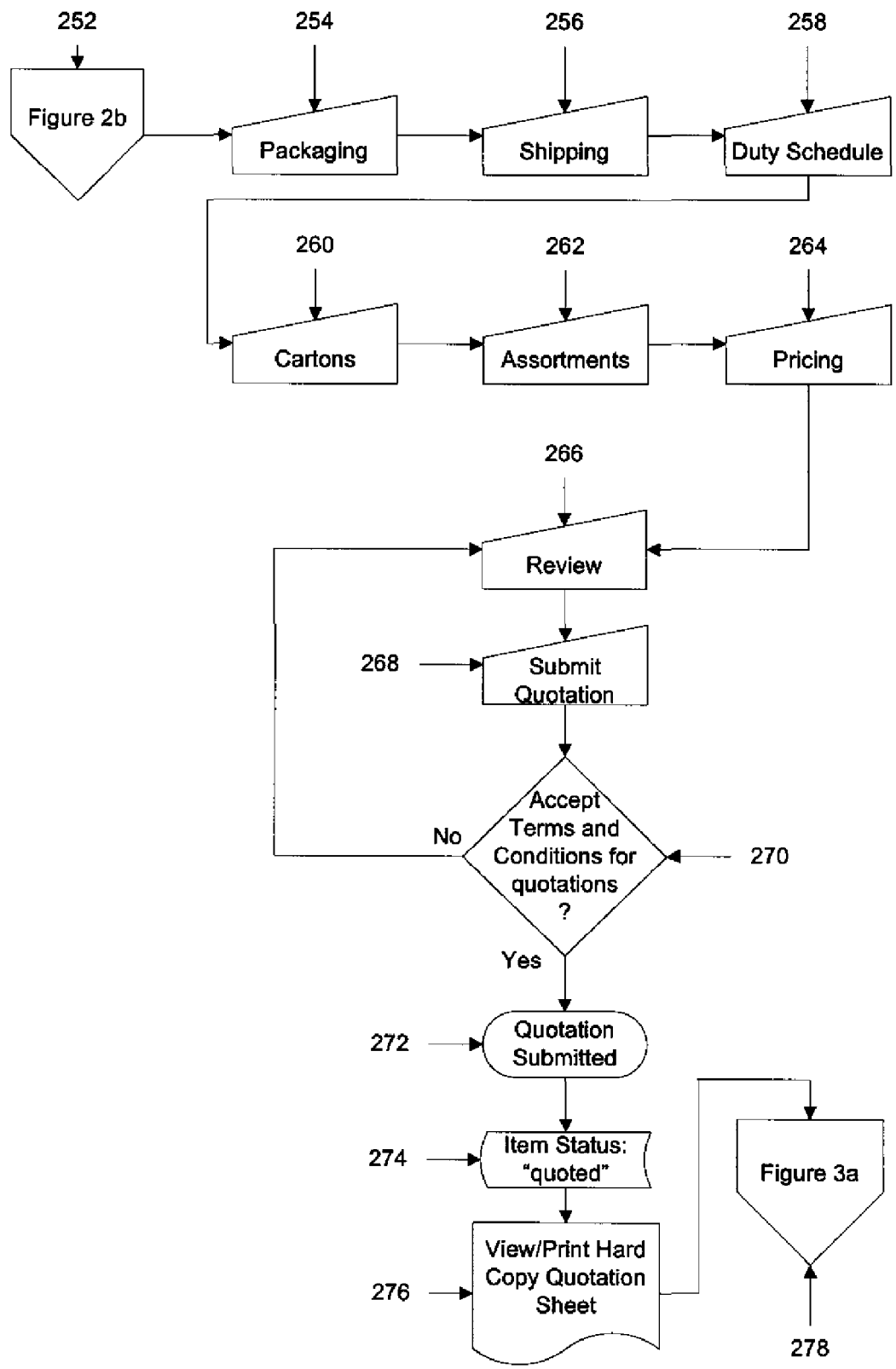

FIGS. 2a-2c pertain to the process of obtaining vendor quotes. The steps include the vendor first logging into the system and setting up their account information, to the completion of a quotation. The vendor first logs into the software application (202). The vendor must have a login identification (204), and if they do not, the vendor is directed to a registration page (206).

Once a login identification is obtained, the system determines whether this is the first time the vendor is logging in (208). If it is the vendor's first login, they are required to agree to the terms and conditions of the system application (210). The vendor is required to complete account information (212) including contact/account information (214), including contact information for the vendor, manufacturer and United States representative. Bank information (216) is also required, the vendor providing their beneficiary and advising bank information.

Upon login, the system of the present invention determines if the vendor information is complete (218). If a vendor's information is not completed, the user will be returned to step 210. If any new fields have been added to the vendor information requirements, the system can then treat each login as new. Once the vendor contact information is completed (220), the vendor may navigate to the program selection page, illustrated in FIG. 2b (222). This page lists all the programs available to the vendor for quoting.

With reference now to FIG. 2b, the vendor has navigated from FIG. 2a (224), and accesses the item selection page (226). The user can choose to select existing quotation from a list, or add a new item (228). If the vendor has selected to view an existing quotation a product information page is provided in a view or read only state (230). If the user selects to edit the page, the system checks to see if the item is already quoted (232). If the item is already quoted, the vendor user receives an error message and is returned to the previous step (234).

If at step 228, the user selects to add a new item, the item status is "unquoted" (236) the default status for such a new item. If either the user selected a new item, or selected to edit an existing quotation that does not have a status of quoted, from step 232, the product information page is presented and the user will complete data entry to include various pieces of required information (238), including vendor item number, universal product code (UPC), item description, seller's comments, item weight, item dimensions, and preferably upload an image of the item. The user can then select to save or discard these changes or inputted information (240). If the user selects to discard, the unsaved data is cleared (244) and the user is returned to step 238.

If the user saves the inputted information and/or changes, the system checks that all required fields are completed (242). If not, the user receives an error message (244) and is returned to step 238. However, if all the required fields have been completed, the user may now navigate to the remaining quotation data entry pages (246). Links for these pages now become available along the menu selection of packaging, shipping, duty schedule, cartons, assortments, pricing and review. Once the user has completed the quotation product information pages, they can now access the remaining quotation data entry pages, illustrated in FIG. 2c (248). Also, if an item status has been set to be requoted by a user at some further point in the quotation review process, the user is able to edit their quotation (250).

The vendor has now navigated from FIG. 2B (252), and has access to a packaging entry data page (254). The vendor completes the data entry for packaging details, including the display type, display size and weight, inner pack and master pack. The vendor also gains access to a shipping data entry page (256), which is completed by entering data for country origin, FOB port, lead time, minimum order quantity (MOQ), and container quantities. As is known in the art, the FOB Port is the port of origin. FOB refers to Free On Board or Freight On Board, referring to the cost quoted by a supplier to produce and deliver the goods "onboard" to the freight forwarder.

The vendor also gains access to a duty schedule page, wherein the vendor enters data regarding quota requirements, category numbers, United States Customs approval codes, duty schedule (item description, harmonized tariff schedule), amount type, amount, unit of measurement (UOM), and number of units per item. A carton data entry page (260) must also be completed, wherein the vendor user enters the number of cartons containing the item, and for each carton list the name, weight, length, width, height and UPC.

An assortment data entry page (262) is also accessed and if the item is an assortment, for each item in the assortment the user will enter the item number, description, UPC, dimensions, weight, duty (assigned from duty schedule), packaging, carton, cost, and pieces. The vendor also typically uploads an image for each item. A pricing data entry page (264) is also accessed, and the user enters the material cost breakdown by name, weight, type, and amount. The FOB price is provided, and broken down according to the cost for labor, material, packaging, and drayage.

After all of the informational pages in steps 254-264 have been completed, the vendor user can review all of this data (266), which is typically provided in a single screen or continuous screen so as to be viewed simultaneously. The vender user can then review and edit the item's status before submitting the quotation (268). That is, from the review page, the user selects to change the item status to "quoted".

The vendor user must agree to accept the terms and conditions for quotations before submitting a quote (270). If not, they are returned to step 266. However, if the user has accepted the terms and conditions, the quotation is submitted (272). The item status is now "quoted" (274). The vendor user may view and print or download a copy of the quotation sheet (276). The system of the present invention will perform a series of data checks to ensure that all required data has been entered in a correct manner before a quotation may be submitted by the vendor and reviewed by importer. A vendor quotation process is now completed, and the information is now available for review by the importer category manager in FIG. 3a (278).

Figure 3A:
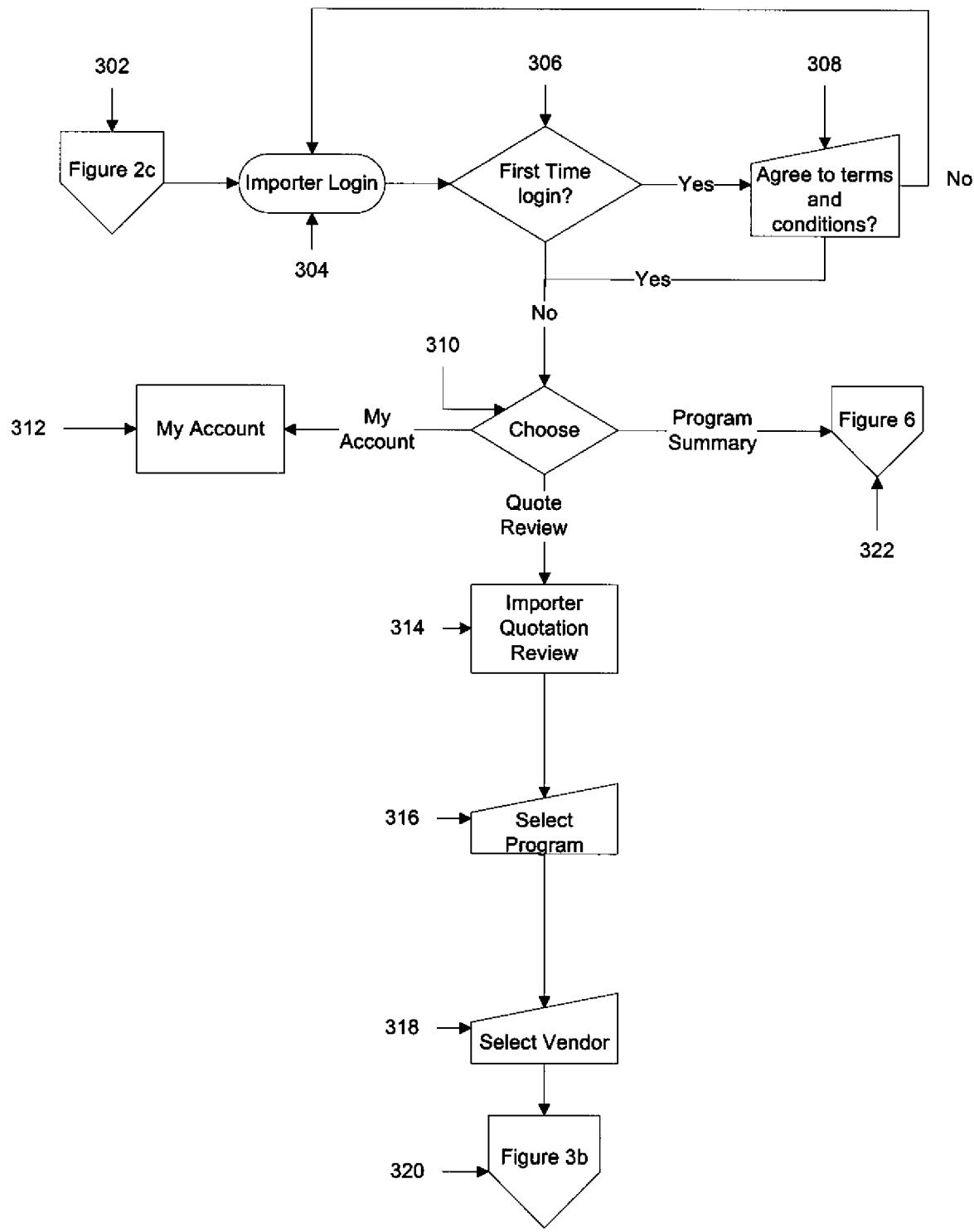
FIG. 3a-3b are flowcharts illustrating the steps taken for an importer category manager review of the vendor's quotation prior to presenting it to the customer, in accordance with the present invention.
Figure 3B:
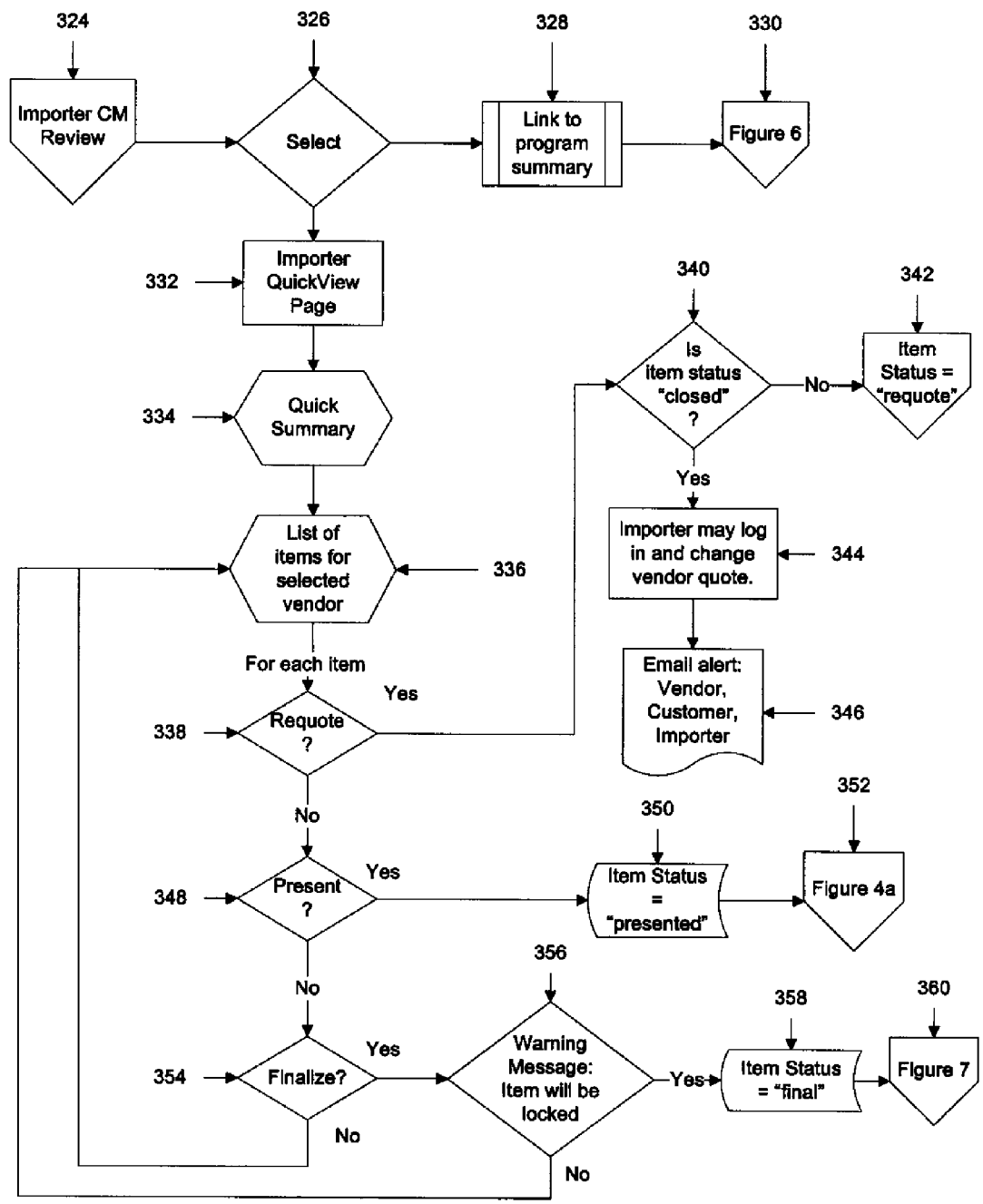

With reference now to FIG. 3, once the one or more vendors have entered all of the required information described above to quote an item to be supplied, the vendor reviews this information for completeness and accuracy and to resolve any problems before the customer can view the quotation. This is typically done by a category manager (CM) of the importing consulting agency/importer. Through a series of filters and selection points, the importer may reassign quotations, request changes to the quotations by e-mailing the vendor, and mark items as presented so that customer category manager may review only items which have been pre-approved by the importer. An importer category manager may also lock items from further editing by both the vendor and the customer in order to allow a program to close.

With reference now to FIG. 3a, once all of the information has been entered by the vendor as described above with respect to FIG. 2 (302), the importer logs in (304). The system determines if this is the first time the importer has logged into the system (306). If so, the importer must agree to the terms and conditions of the system (308), and if they do not, they are returned to the login page (304). However, if they do agree to the terms and conditions, or have previously logged in, the importer is presented with a selection (310) of "my account", "program summary", or "quote review". If the importer user selects "my account" (312), the user can edit their account preferences, such as who is to receive status notifications via e-mail, edit their contact information, etc.

If the importer category manager selects "quote review", the importer quotation review (314) links are provided so that the importer user may move on to program, vendor, and item selection. In the select program (316), the user selects a vendor from a program drop down box populated with programs containing items assigned to the importer category manager. In the select vendor link (318), once the user has selected a program, he or she will then select a vendor from a drop down box populated with vendors in the selected program containing items assigned to the importer category manager. After selecting program and vendor, the importer user moves to FIG. 3 to continue the quotation review (320).

Figure 6:
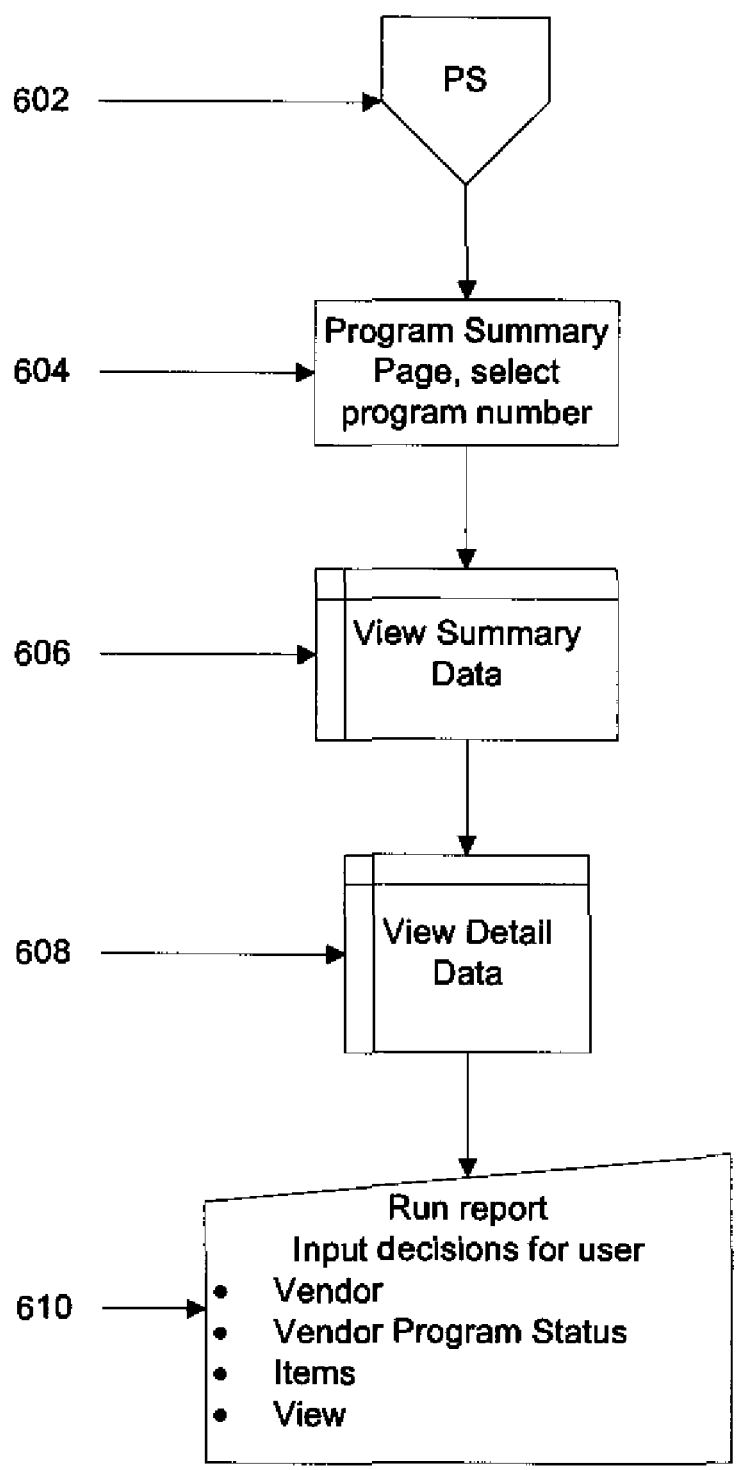
FIG. 6 is a flowchart illustrating the steps for a program summary, in accordance with the present invention.

If in step 310, the importer user selects "program summary", program summary pages or links are presented to the user, as will be more fully described in FIG. 6 (322).

Continuing on with the importer category manager review (324), the importer user selects (326) either a link to a program summary (328), or an importer quick view page (332). From the importer quick view page, the importer user may select a link to the program summary, and the user will navigate to links and pages more fully described in FIG. 6 (330).

At the importer quick view page, the user may select to filter data to review items with selected statuses (i.e., new quotations, requotes, both new and requotes, statuses of quoted or closed). On the importer quick view page the user may view a quick summary listing (334) which lists the program number, vendor number, vendor name, and a count of the various item statuses within the selected program and vendor. That is, a list of items for the selected vendor (336) is displayed, including item number, A or S (signifying if the item is an assortment item or a single item), last year purchases (number of pieces), FOB port (if an unusual port, this is highlighted), a link to the image, FOB price for each, distribution center per piece cost, master pack, and the projected order quantity. The importer user can also choose to do the following: view quotation (verification form style), filter by item selection status, change customer category manager, or change the importer manager. Options include to check all items on this page, change the importer category manager, change the customer category manager, e-mail vendor regarding an item, or change the item status.

The importer user may elect to requote (338), selecting to set the item status to requote at step 340. The system checks to see if the item status is closed (340), meaning that the item is now closed to negotiations with the vendor and the importer may override the quotation data. If not, the item status is "requote" (342) and the quotation is unlocked and the vendor may requote the item (step 250). If the item status is indeed closed (344), the importer may log in and change vendor quotations. The system will log changes made by the importer to keep the integrity of the vendor's quotation. When the importer overrides quotation data, the vendor, customer, and importer can be alerted regarding the change, such as by e-mail (346).

For each item, if the importer category manager elects not to requote the item, the importer user may select to set the item status to "presented" (348). The item status is changed to "presented" (350) and the customer may now have access to the item as illustrated in FIG. 4 (352).

However, if the importer user does not select to set the item status to "presented", the system asks the importer user whether to finalize the item (354). If the user selects to finalize an item, a warning message is presented that the item will be locked (356). The user has selected to finalize a quotation, meaning all the work has been completed for the quotation. If the user selects to mark the item as final, the item status is changed to "final" (358), and the quotation is completed and may move to inventory management, illustrated in FIG. 7 (360).

If the importer user decides to either not finalize the item quotation in steps 354 or 356, the user is returned to step 336 to view the list of items to be selected for the selected vendor.

With reference not to FIG. 4, the steps taken by the customer category manager in reviewing the quotation are illustrated. As it will be more fully described herein, the customer category manager may review item quotations, select items to remain in the program, enter their own company internal data for each quotation, enter advertisement information, collect statistics on the total status of quotation review for program and vendor, request read-quotes, and reassigned quotations to other category managers.

Figure 4A:
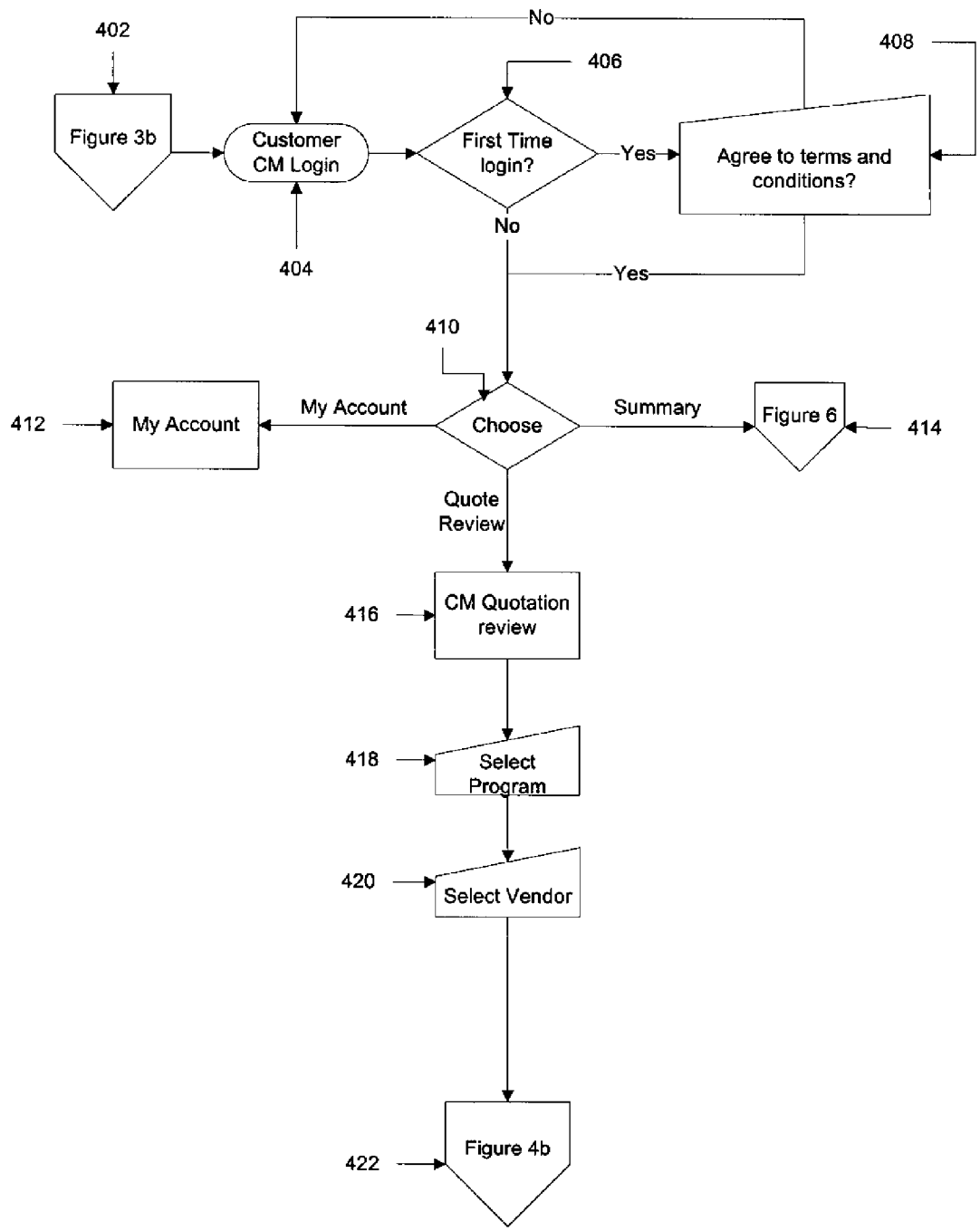
FIG. 4a-4c are flowcharts depicting the steps of review of a customer category manager, in accordance with the present invention.

With reference now to FIG. 4a, after the importer category manager review has been completed (402), the customer category manager can login to the system (404). The system determines whether this is the customer category manager's first time logging in (406), and if it is the customer must agree to the terms and conditions imposed by the system (408), and if they do not they are returned to the login page (404). However, if they agree to the terms and conditions or they have previously logged in, the customer user is presented with a selection (410) of "my account", "summary", and "quote review". If the customer user selects "my account", the user may select to edit their contact information and system preferences through this menu option (412). If the user selects "program summary", the user will be navigated to the program summary menu, more fully described in relation to FIG. 6 (414).

If the customer user selects "quote review", they are linked to a category manager quotation review (416) page or links where the user will begin the process of item review and selection. The customer category manager quotation review begins by selecting a program (418) from a program drop down box which is populated with programs containing items assigned to the customer category manager. The user may select a vendor (420) through a vendor drop down box which is populated with vendors in the program selected in the previous step which contain items to the customer category manager who is currently logged into the system. After selecting the program and vendor, the user will navigate to other portions of the system, illustrated in FIG. 4b (422).

Figure 4B:
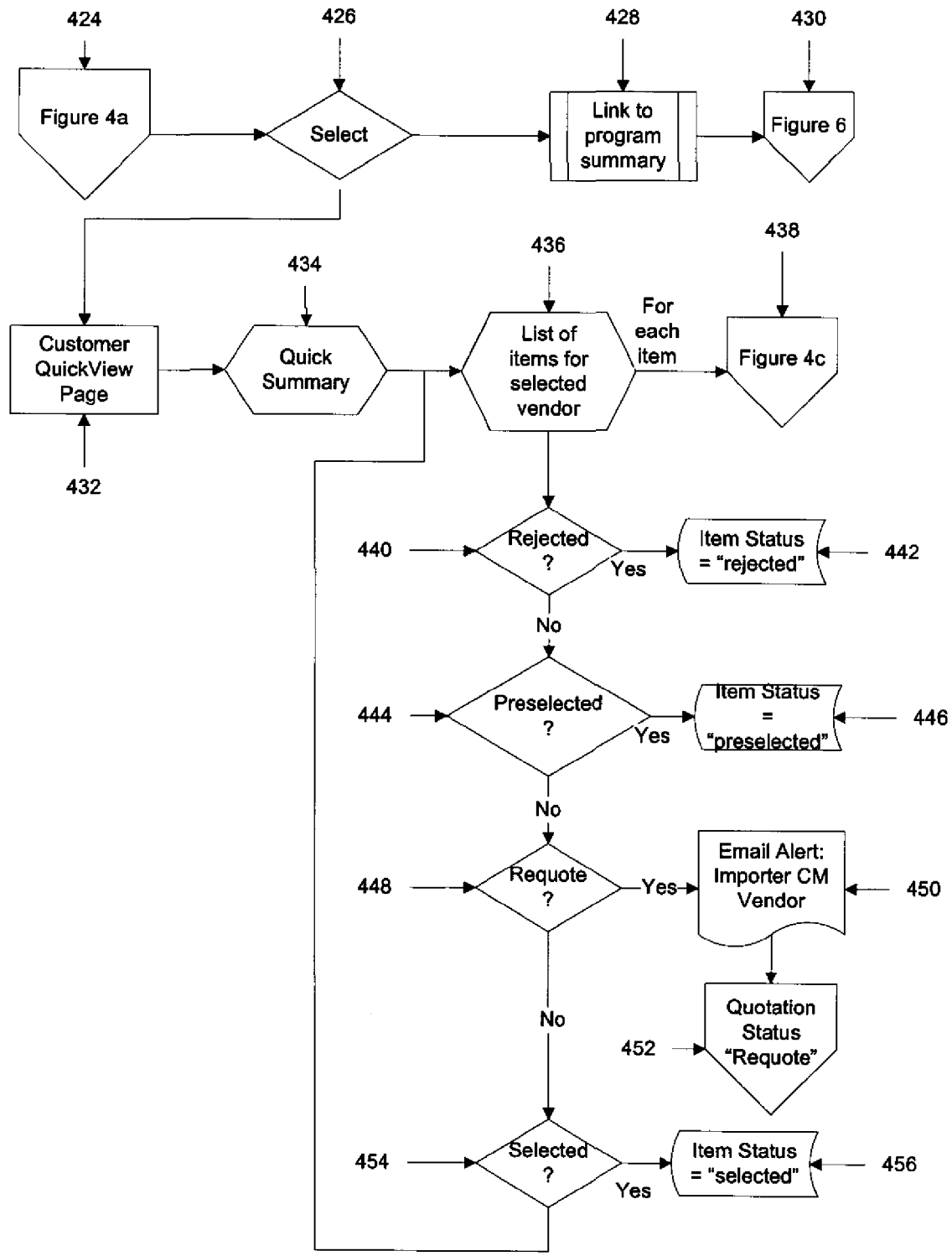
Figure 4C:
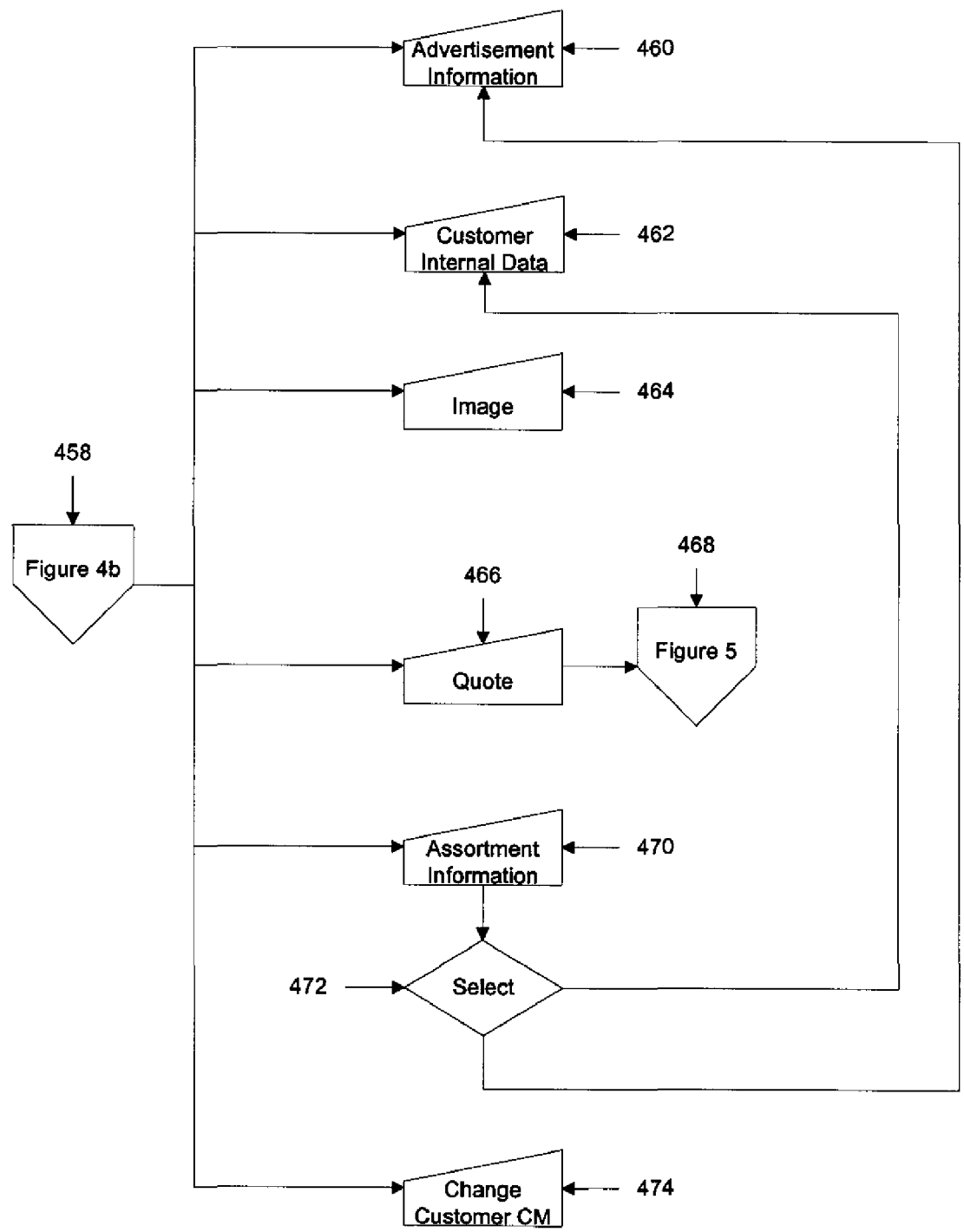

With reference now to FIG. 4b, continuing with the customer category manager review from FIG. 4A (424), the user selects (426) either a link to the program summary or customer category manager quick view page. At the link to the program summary selected (428), the user navigates to a program summary, more fully described in FIG. 6 (430).

If the customer selects to enter the quick view page (432), on this page the user may select to filter data to review items with selected statuses (i.e., new quotations, requotes, both new and requotes, statuses of quoted or closed). On the customer quick view page, the user may view a quick summary listing (434) which lists the program number, vendor number, vendor name, and a count of the various item statuses within the selected program and vendor, similar to that described above with respect to the importer category manager. The list of items for each selected vendor (436) is displayed, including item number, A or S (assorted item or single item), last year purchases, FOB port, a link to the image, FOB price for each, distribution center per piece cost, master pack, and the projected order quantity. There are other links, which the user can choose to do the following: view quotation, filter by item selection status or change customer category manager, check all items on the page, change the importer category manager, change the customer category manager, e-mail the importer regarding an item, or change the item status. In step (438), the user may navigate to continue the item review process, as more fully described in FIG. 4c. In the item review process, the customer category manager may review item quotations, enter their own company internal data for each quotation, and enter advertisement information. As the user reviews quotations and completes data entry, they must also navigate through steps (440-456).

In step 440, the user is asked to reject the item status. If the item status is rejected, the status is changed to "rejected" (442). However, if the user does not reject the item status, the system asks if the user selects to pre-select item (444). If so, the item status is changed to "pre-selected" (446). If not, the system asks if the user would like to requote on an item (448). If so, an e-mail alert is sent to the importer category manager and the vendor (450), and the quotation status is changed to "requote" (452). If the item is not to be requoted, the user either marks the item as selected (454), changing the item status to "selected" (456), or the user is returned to the list of items for the selected vendor (436).

Once the user has navigated from these steps (458), the customer category manager can now perform the following task for each item: enter advertisement information, customer internal data, view the item image, view the quotation, change the item selection status, view assortment information, or change the customer category manager identity. When entering advertisement information (460), the customer is directed to an internal advertisement data entry page, where the customer may add several lines of advertisement data for each item. At the customer internal data page (462), the customer may input miscellaneous data entry, customized as per the customer's request. The customer may also click a link to view the quotation image (464). The user may also navigate to the quotation/verification data page (466). On this page, the user will view all item data, and for the previous year if the item is a requote item. If the item is a requote item, then the updated data which differs from the previous years will be highlighted so the user can see what has changed. In addition to the quotation data, the user can view the advertisement and internal data which was entered by the category manager. The user may navigate to the quotation verification form, more fully described in relation to FIG. 5 (468).

In the assortment information page (470), the user may review the data for each item in an assortment. This includes, the item number, description, image, UPC, item dimensions, weight, duty, packaging, assigned carton cost, number of pieces in the assortment and the distribution center (DC) landed cost for each. The user may also select (472) to enter advertisement (460) and internal data (462) for each assorted item. The customer may also select to move an item to be assigned to another category manager (474).

Figure 5:
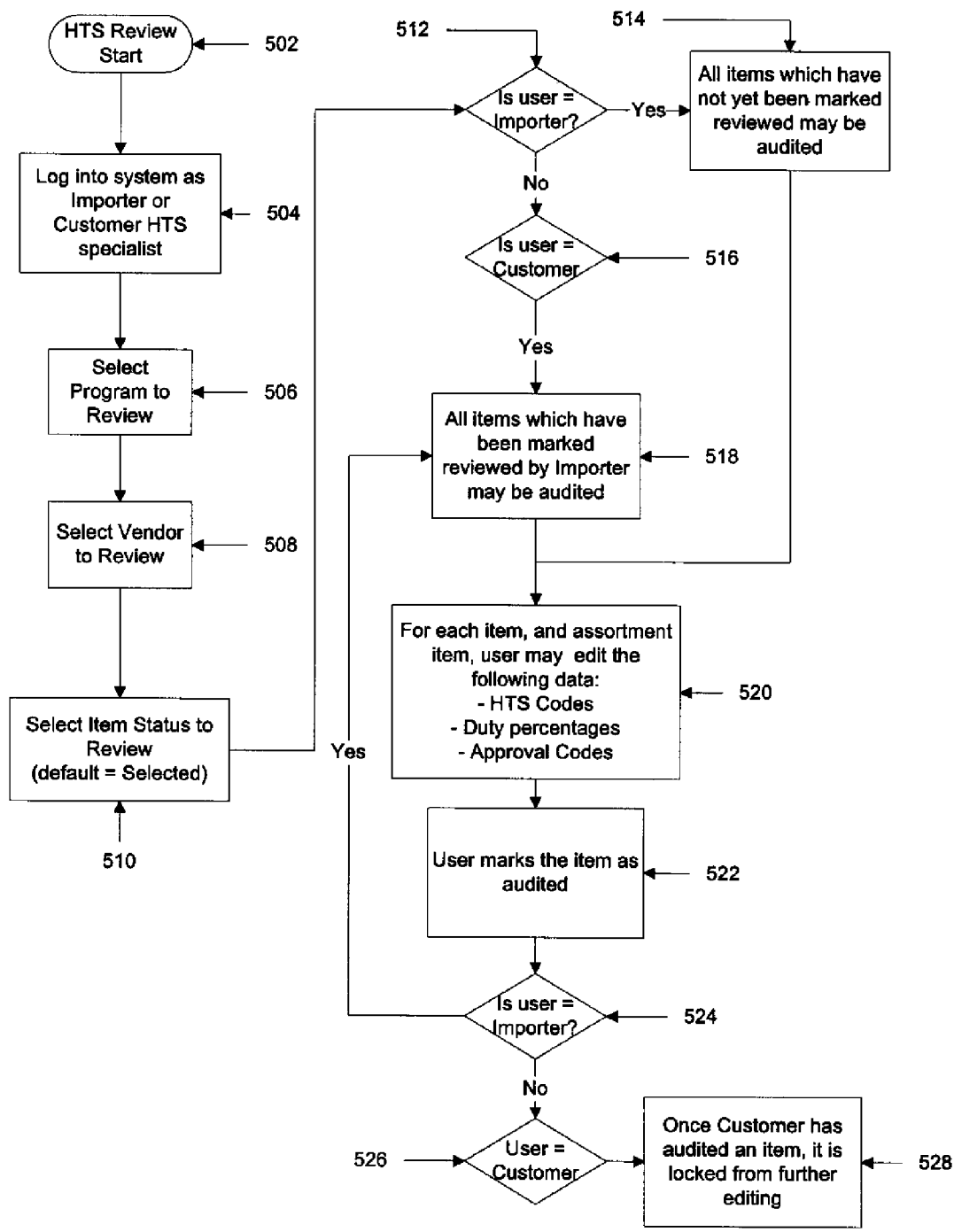
FIG. 5 is a flowchart illustrating the steps taken to review and create a harmonized tariff schedule, in accordance with the present invention.

With reference now to FIG. 5, every item imported into the United States is assigned a harmonized tariff schedule (HTS) number and associated duty rate as it is being cleared through U.S. Customs. The importer of record (typically the customer) is responsible for these classifications, and is subject to severe penalties for misclassified items. As a service, the importer in the system of the present invention typically classifies all items for U.S. Customs. Using the system of the present invention, an item may be reviewed by both the importer and the customer, ensuring that the best classifications are made for each item. However, due to the fact that customer is the importer of record, they have the final decision for the HTS classification and may then lock the quotation from further adjustments. HTS reviews typically data after the customer category manager has made their final selections for an item, although it may be done at any time. The timing for HTS review depends on the requirements set by the customer.

With reference now to FIG. 5, the HTS review is started (502). The user logs into the system (504) as either an importer or customer HTS specialist. The user selects which program to review (506). The user then selects which vendor to review (508). The user then selects the item status to review (510), the default filter being selected items. The system then determines whether the user is an importer (512), and if so all items which have not yet been marked reviewed may be audited (514). However, if the user is a customer (516) the customer may view and audit all items which have been marked reviewed by the importer (518).

For each item and assortment item, the user may edit data (520), including HTS codes, duty percentages, and approval codes. Once the customer has audited an item, the item is marked as audited (522). The system then determines if the user is an importer (524), and if so, the importer is directed to the items which have been reviewed and may be audited. However, if the user is a customer (526), once the customer has audited an item, it is locked from further editing (528).

With reference now to FIG. 6, the steps, pages and links available in the program summary are illustrated. The program summary may be accessed by both the customer and the importer. This page allows the user to get an at-a-glance summary of the quotation status for any program. In step 602, the user has navigated from a previous figure to select program summary. At the program summary page, the user selects the program number they need to see (604). The user is view the following summary data (606): vendor name, and totals (total number of items, total marked pre-selected, selected, rejected, and final). For each item (if detail view is selected), the item number, description, status, master pack, FOB, and estimated land bid cost (ELC) will be displayed. For a selected program, the data will be displayed (608) and the user will view the customer category manager name, program, year, date program open for quotation, date program closed for quotation, date program closed for review, data program downloaded to customer, total number of vendors in the program, total number of items, count of items and vendors which have been reviewed and are remaining to be reviewed. The user may run a report (610) in which the user may select the vendor (all vendors or individual vendors from a list of names), item quotations (all, pre-selected, selected, rejected, final, or closed), and view (summary, which is the only data for each vendor, or detail, which shows the details for each vendor and their associated items).

With reference now to FIG. 7, inventory management is responsible for exporting quotation data in batches at the time a program closes. This user is also responsible for entering warehouse estimates (estimated quantity to be ordered per distribution center for each item) which allows the importer to negotiate price from the vendor. Inventory management is also responsible for closing a program for item quotation. This requires review of the current program status and is the final step in quotation before orders are cut.

Figure 7A:
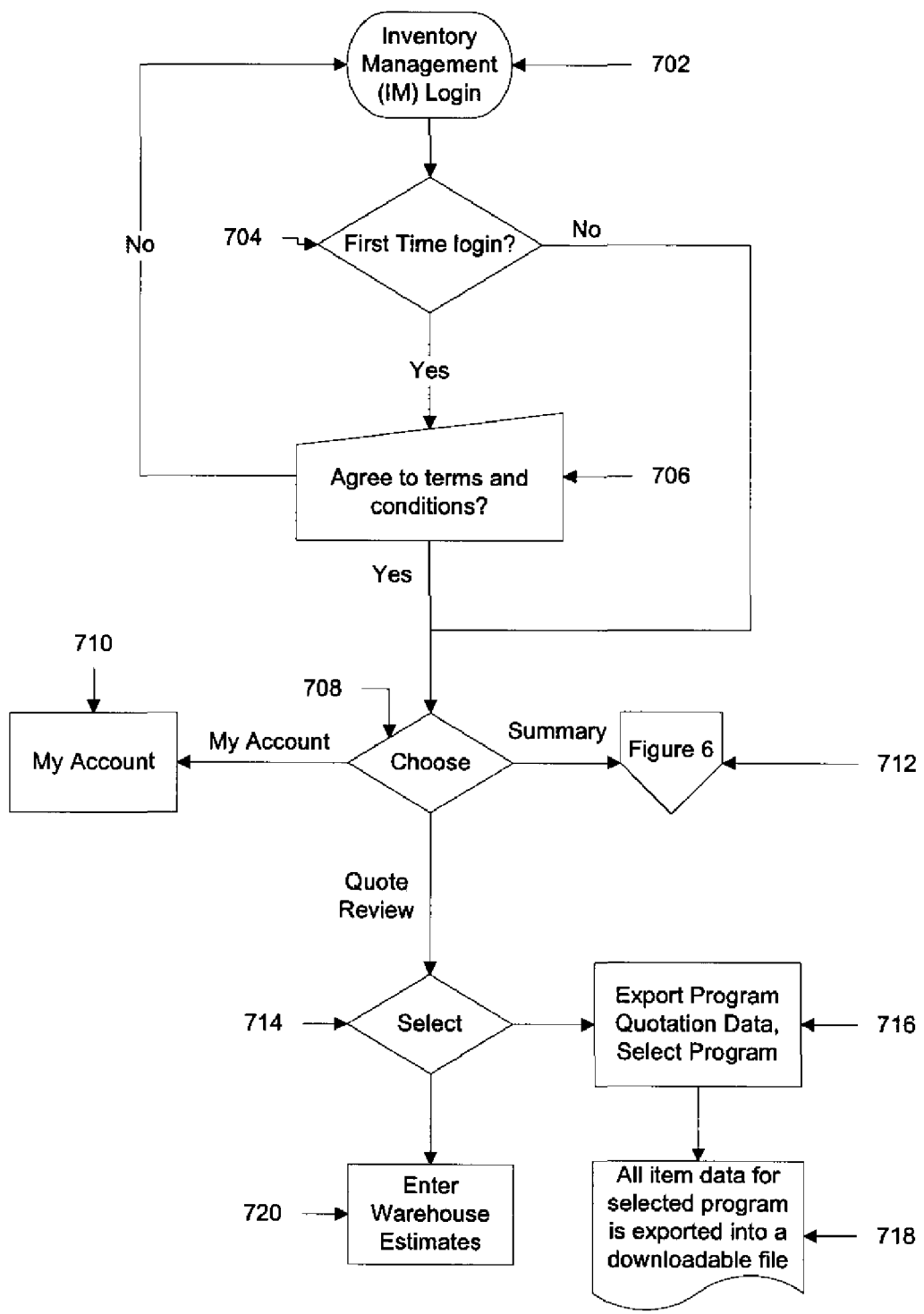
FIG. 7a-7b are flowcharts illustrating the steps taken for inventory management, in accordance with the present invention.

With reference now to FIG. 7a, the user logs in as the inventory manager (IM) (702). The system determines whether this is the first time login for the inventory manager (704). If so, the inventory manager must agree to the terms and conditions of the system (706). If not, they are returned to the login box. However, if the terms and conditions are agreed to, or the user has logged in before, they are presented with a selection (708) in which they choose either "my account", "summary" or "quote review". If the user selects "my account" (710), the user may edit their account options, notification preferences, password and contact information. If the user selects "program summary", the user navigates to the program summary pages, illustrated and described in relation to FIG. 6 (712).

If the user selects "review", the user may select (714) to export program quotation data (716). All item data for the selected program is exported into a downloadable file (718). If the user has selected to enter warehouse estimates (720, the user enters warehouse estimate quantities for each of the customer's distribution centers. Selection is done by the program and the vendor.

Figure 7B:
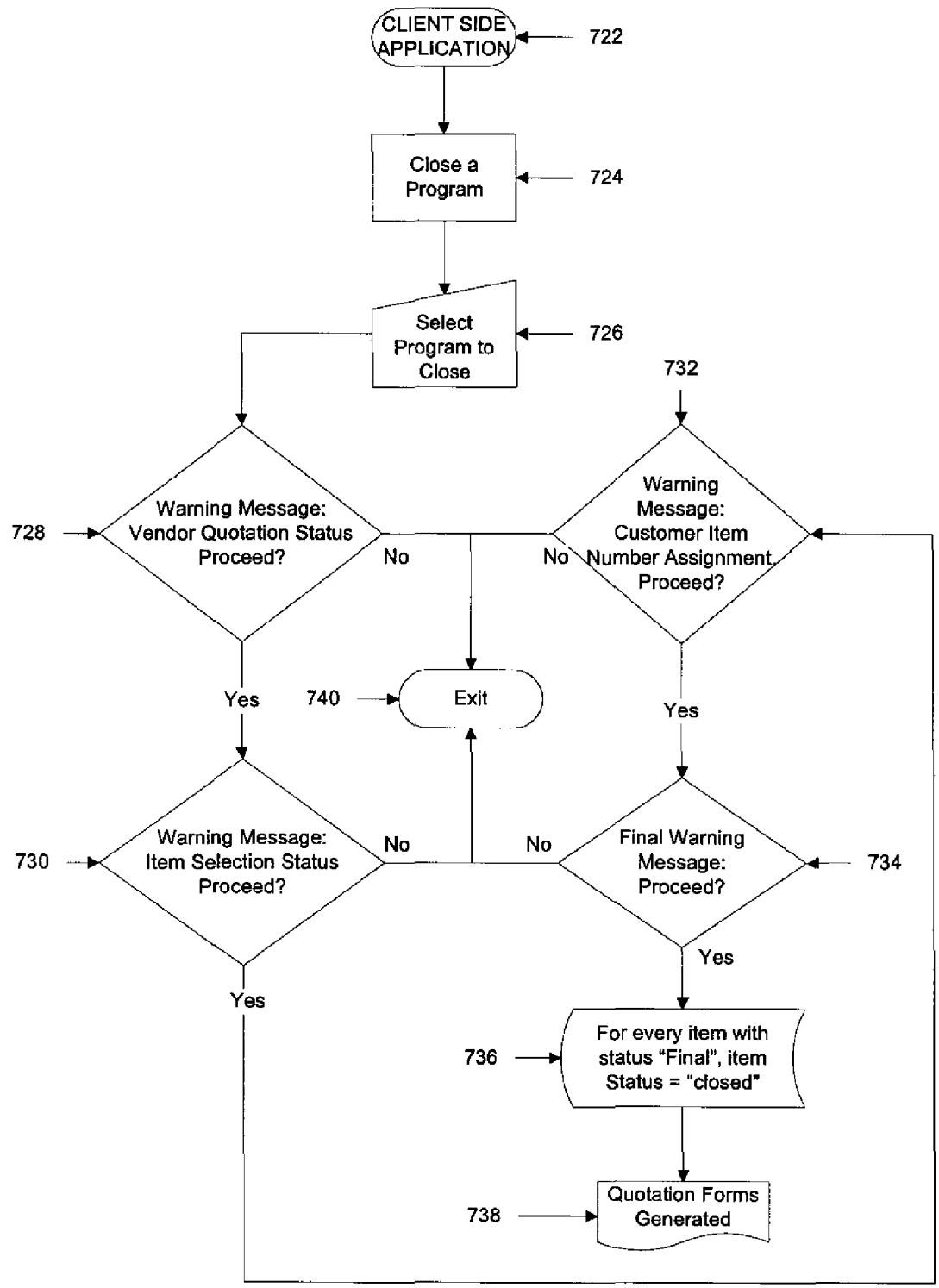

With reference now to FIG. 7b, the inventory manager accesses a client side application (722), whereby the inventory manager may close a program. The user selects to close program (724), and selects which program they wish to close (726). Typically, a warning message is given (728), such as "There are X items in a status of unquoted or requote in this program. Do you still was to close this program?" If not, the user exits (740). However, if the user wishes to proceed, another warning message is provided (730) about the item selection status. Such warning may be "There are X items not yet marked final. Do you still want to close this program?" If not, the user exits (740). However, if the user wishes to proceed, yet another warning message is given regarding customer item number assignment. Such warning may be "There are X items not yet assigned a customer item number. Do you still want to close this program?" If not, the user exits (740). However, if the user wishes to proceed, a final warning message is provided (734). The message may be such as "You are about to close this program. This cannot be undone. Are you sure you wish to proceed?" If not, the user exits (740). However, if the user wishes to proceed, for every item with a "final" status, the item status is changed to "closed" (736). Printable quotation forms are generated (738), based on customer requirements, and the program is exited (740).

Figure 8:
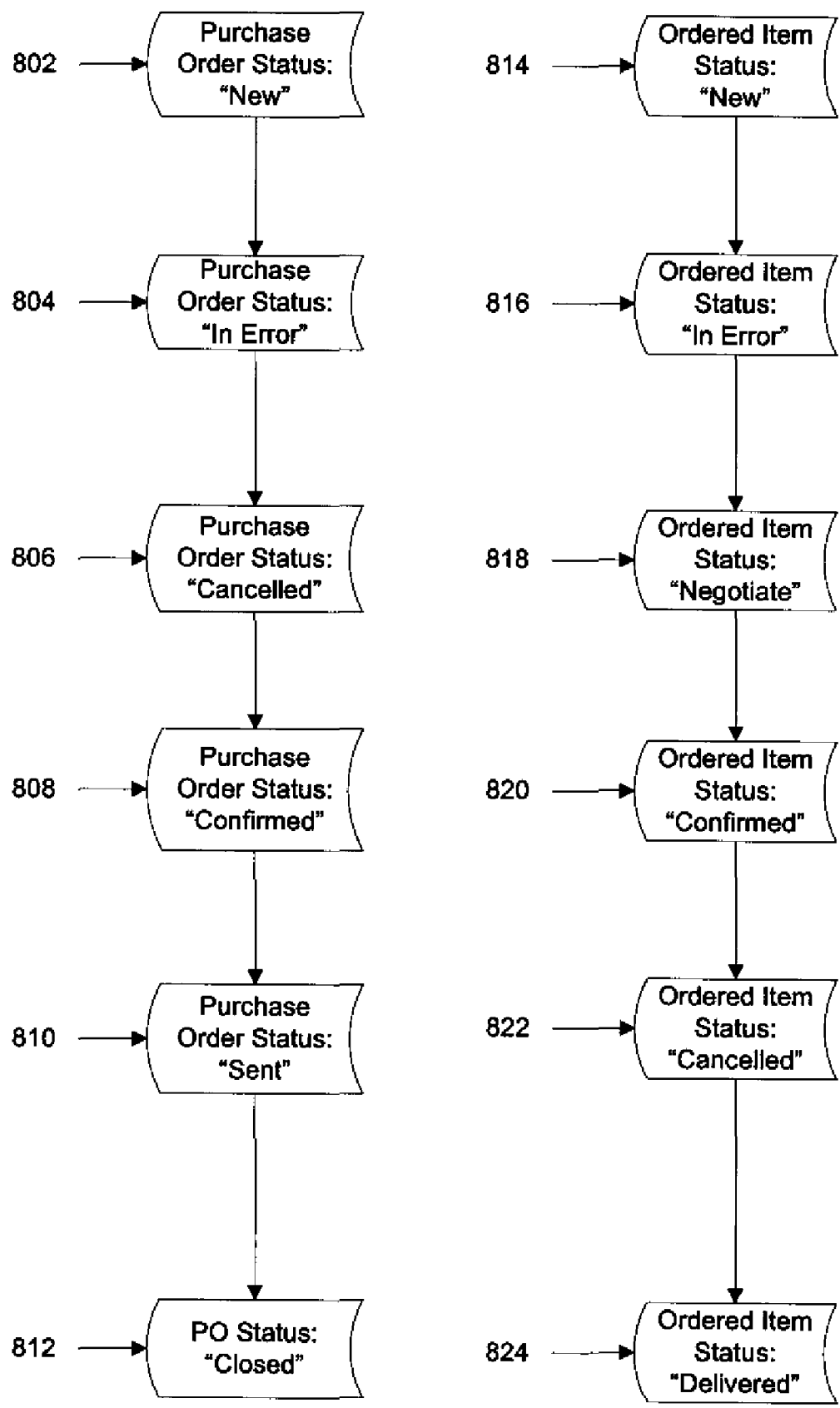
FIG. 8 is a flowchart illustrating the purchase order status life cycle, as well as each status for a purchase order line item, in accordance with the present invention.

With reference now to FIG. 8, a flowchart is provided which describes the status within each purchase order (purchase order) life cycle, as well as each status for a purchase order line item. The purchase order status "new" (802) if a new purchase order has been received without error. If the purchase order status is "in error" (804), if a new purchase order has been received in error, meaning data was missing or does not match to the data stored in the quotation. A purchase order status is "cancelled" (806) if every item on a purchase order is cancelled. A purchase order status is "confirmed" (808) if every line item on the purchase order has either been confirmed or cancelled. If the purchase order status is "sent" (810) if the purchase order has been completed and forwarded to a freight forwarder. A purchase order status is "closed" (812) if all ordered items on the purchase order are either delivered or cancelled.

An ordered item status is "new" (814) if a brand new ordered item is received without error and pending vendor review. An ordered item status is "in error" (816) if an error occurred when receiving the item order. An ordered item status is "negotiate" (818) if the vendor has requested a change in the purchase order and it is in the negotiation process. An ordered item status is "confirmed" (820) when order details for the item have been confirmed by the vendor. An ordered item status is "cancelled" (822) when the order for the item has been cancelled. The ordered item status is "delivered" (824) when the total quantity of ordered items have been delivered, that is the inspection certificate has been released.

Figure 9:
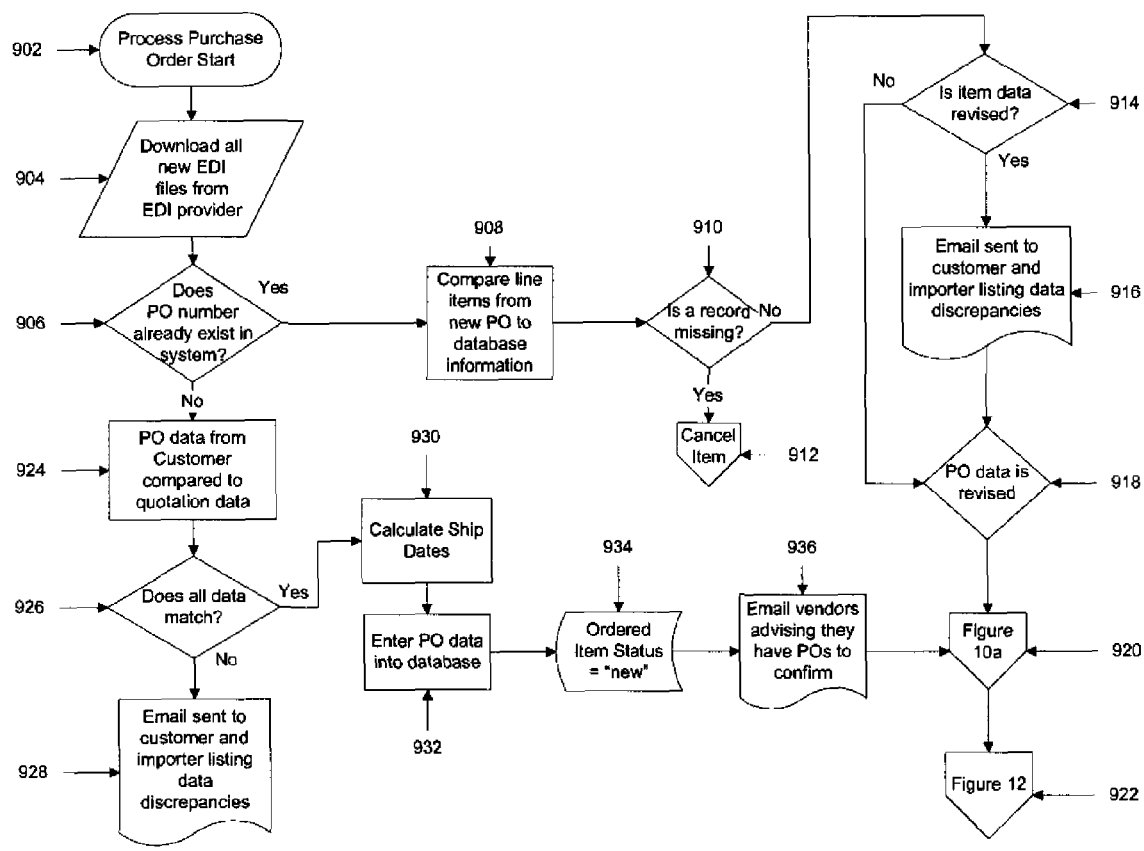
FIG. 9 illustrates the steps taken for processing an incoming purchase order, in accordance with the present invention.
Figure 12:
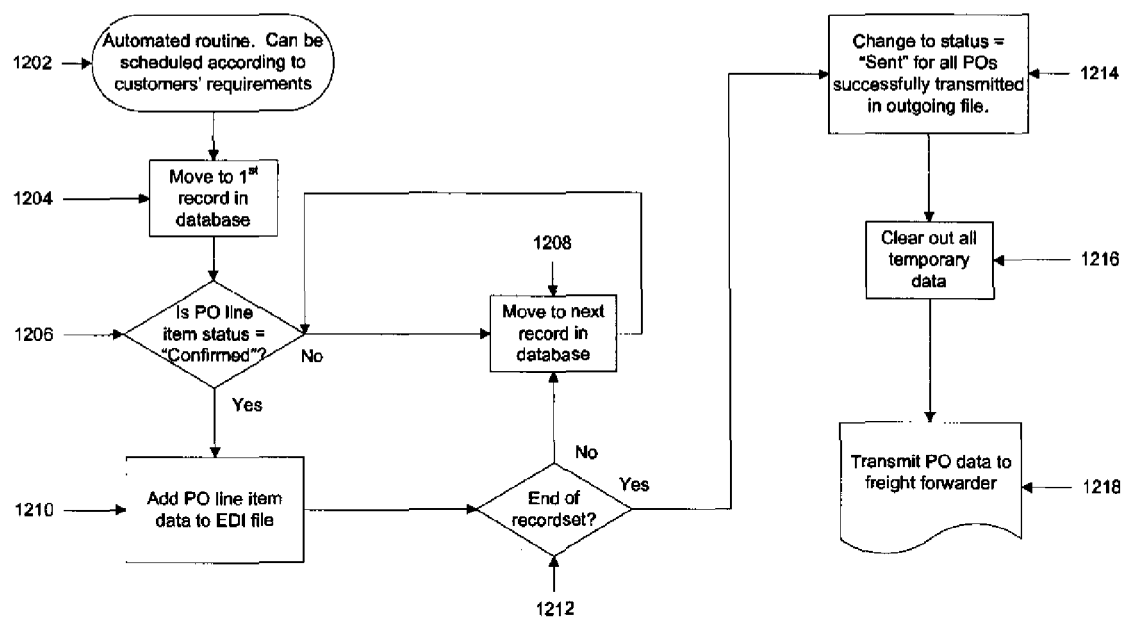
FIG. 12 is a flowchart depicting the steps taken to transmit the purchase order to the freight forwarder, in accordance with the present invention.

With reference now to FIG. 9, incoming purchase orders from a customer are processed automatically. After successful completion of a series of checks and balances, including notifications for all data discrepancies, purchase orders are loaded into the system and vendors are notified that they have purchase orders to review. To start the purchase order process (902), all new electronic data interexchange (EDI) files are downloaded from the EDI provider (904). The data received varies by customer. The system then determines if the purchase order already exists in the system (906). If the purchase order number already exists in the system, the system compares line items from the new purchase order to the database information (908). The system then determines if a record is missing (910). If a record is missing, the item is cancelled (912). However, if no records are missing a check is made to see if the item data is revised (914). If the item data is revised, an e-mail is sent to the customer and importer listing data discrepancies (916). A customer cannot revise item data, thus any data that does not match the quotation data has been received in error. If the item data is not revised, then the purchase order data is revised (918). A customer can revise the purchase order data, or confirm the purchase order, as more fully described in FIGS. 10 and 12 (920 and 922). That is, after successful completion of the confirmation process (FIG. 10), the data is transmitted to the freight forwarder (FIG. 12).

Referring back to step 906, if the purchase order number did not already exist in the system, the incoming purchase order data from the customer is compared to the quotation data (924). The system then determines if all of the data matches (926). If not, an e-mail message is sent to the customer and importer listing data discrepancies from the incoming file (928).

However, if the data does match, the shipping dates are calculated (930). To calculate the latest ship date is the delivery date minus 30 days. The first ship date is calculated as the final ship date minus 14 days. The purchase order data is then entered into the database (932). The system now stores the purchase order data into the database. For each new ordered item, it is entered into the database with a status of "new" (934). E-mail notification is then sent to vendors advising they have orders to confirm (936), before proceeding onto purchase order confirmation and transmittal of data to freight forwarders, as illustrated and described with respect to FIGS. 10 and 12.

With reference now to FIG. 10, once the vendor receives a notification that they have a purchase order to confirm, the vendor may login and access a purchase order summary report, detailing all orders available for confirmation. Once the vendor has internally reviewed orders and booked with their production factories, there is a procedure for confirming a purchase order, which is illustrated in FIGS. 10*a*-10*d*. Through this series of steps, the vendor may confirm, cancel or negotiate purchase order details. Customer and importer may review all requested negotiations and revise purchase orders as needed to allow for final vendor confirmation.

Figure 10A:
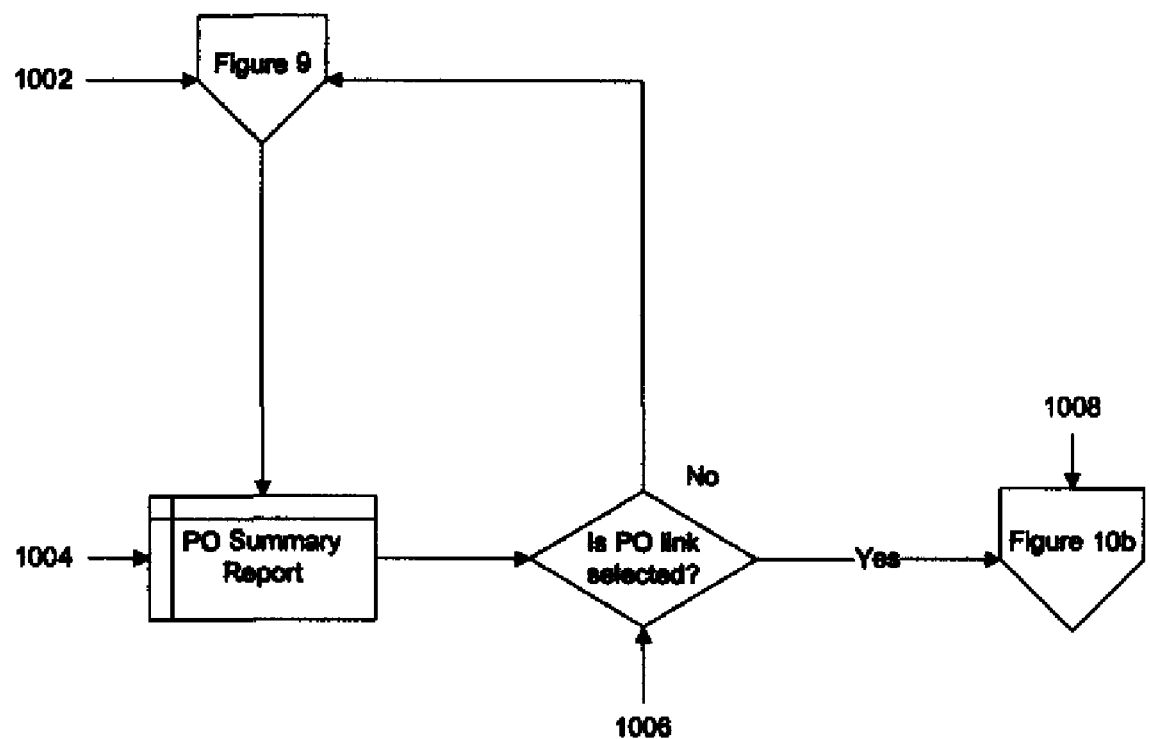
FIG. 10a-10d are flowcharts illustrating the confirmation of a purchase order, in accordance with the present invention.

With reference not to FIG. 10*a*, after receiving incoming purchase order data (FIG. 9) the vendor confirms their purchase order (1002). The vendor logs into the system and navigates to purchase order summary report (1004) where they may filter data by purchase order status, program number, and distribution center (DC). After filtering, report data displays the following data: purchase order number (with a link to the purchase order detail, requested delivery date, earliest ship date, latest ship date, payment type, status, extend FOB cost. The summary displays the total FOB and the user may also choose to export the report in a variety of formats. The purchase order link may then be selected (1006), in which the purchase order confirmation process is continued. If not, the purchase order confirmation process begins over again.

Figure 10B:
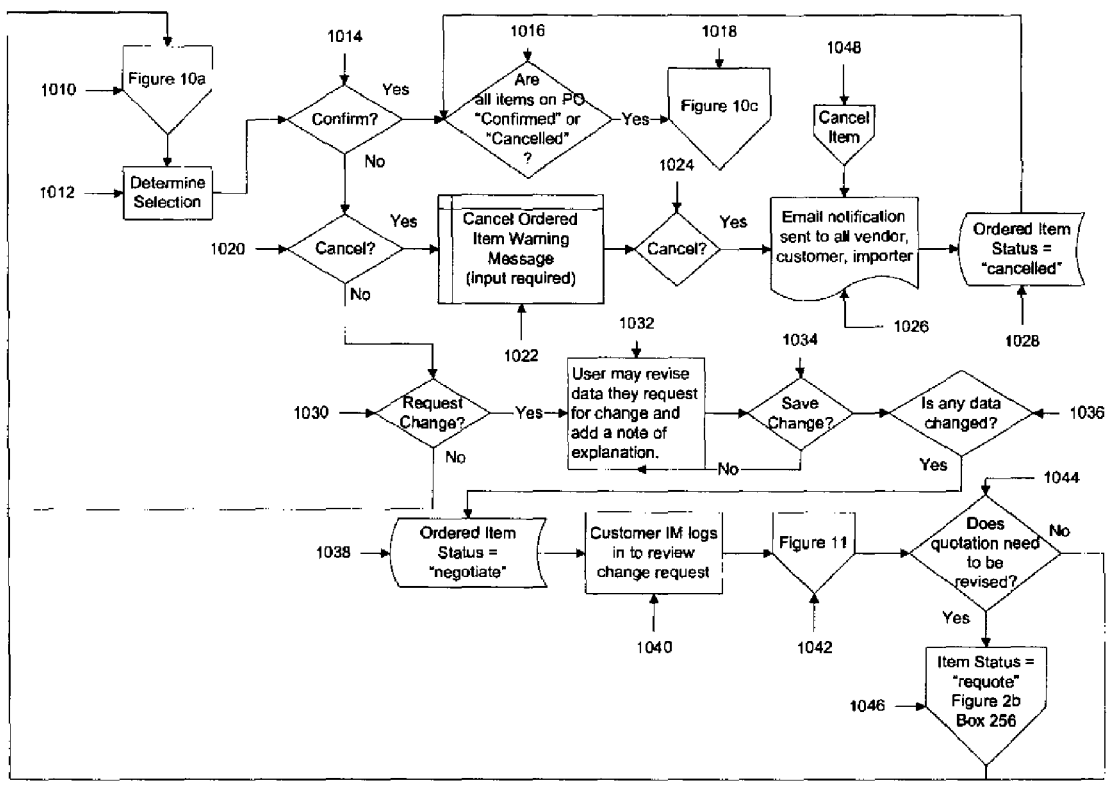
Figure 10C:
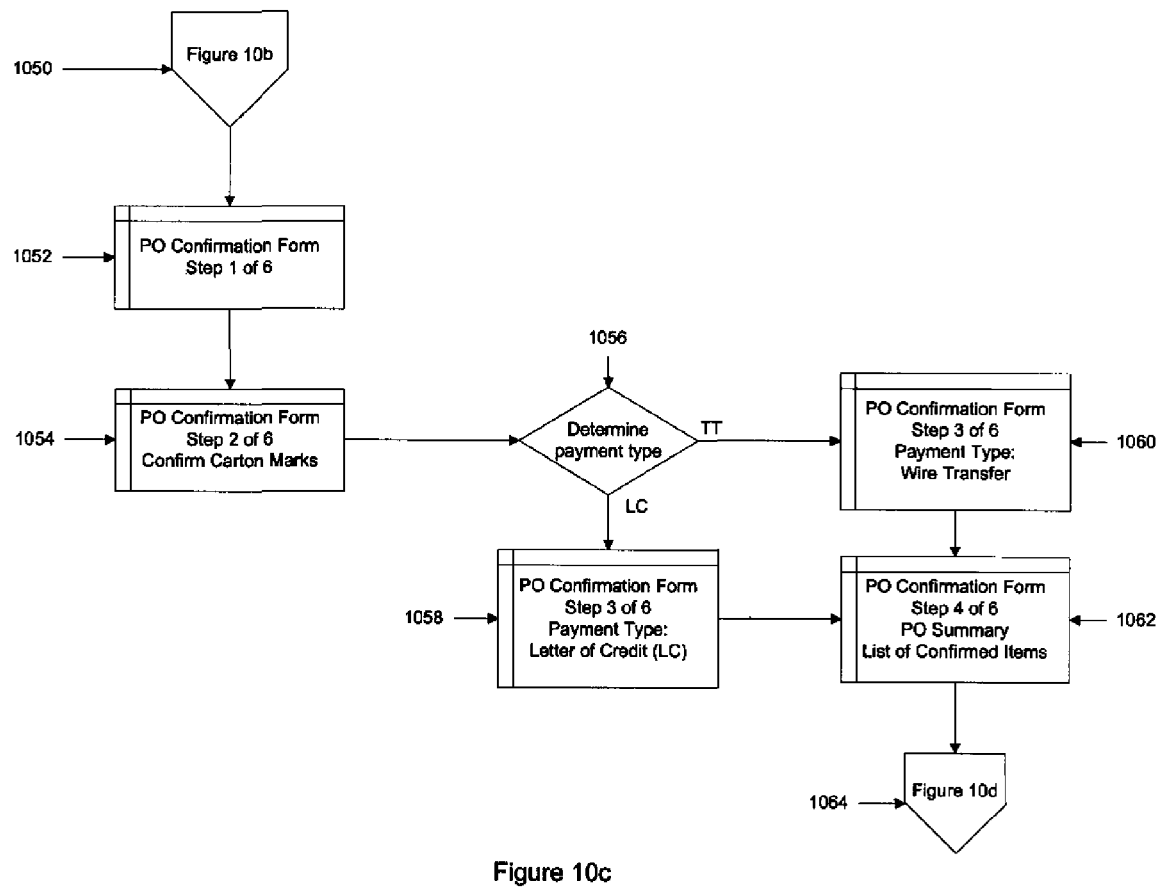
Figure 10D:
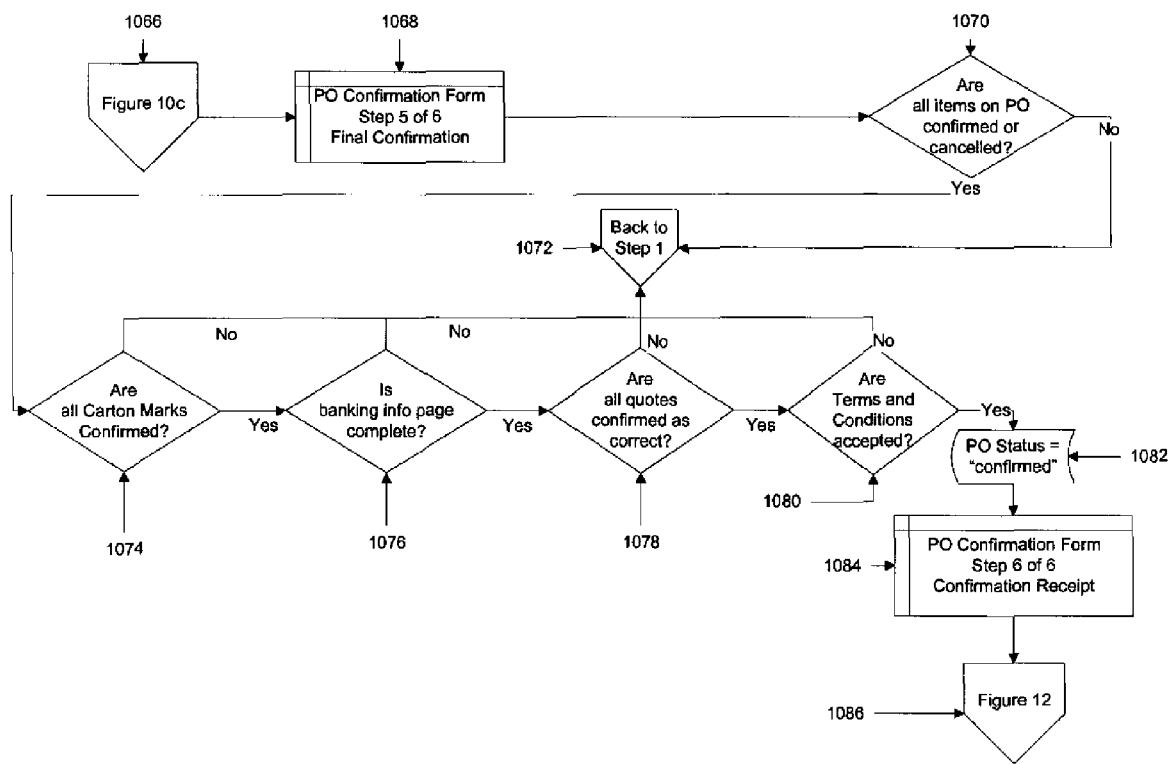

With reference now to FIG. 10*b*, the process continues on from FIG. 10*a* (1010). This begins the actual purchase order confirmation. The user begins line by line confirmation of each purchase order. This determines the user's selection (1012). The system asks if the vendor would like to confirm the purchase order (1014). If yes, it is determined whether all items on the purchase order are "confirmed" or "cancelled" (1016). If so, then the next step is illustrated in FIG. 10*c* (1018). If not, no further action is taken period.

If the vendor elects not confirm the purchase order, the vendor is then given the opportunity to cancel (1020). If the vendor decides to cancel the purchase order, the cancel ordered item warning message (1022) is given. The user is asked to attempt to negotiate an order before canceling. If the user still wishes to cancel, they typically must add a reason to the purchase order notes. If after receiving the warning, the user would still like to cancel (1024), an email notification is sent to the vendor, customer, and importer (1026). If not, the vendor is taken back to step 1010. When a purchase order is cancelled, the item status is "cancelled" (1028) and then the vendor is taken to step 1016, as described above.

Figure 11:
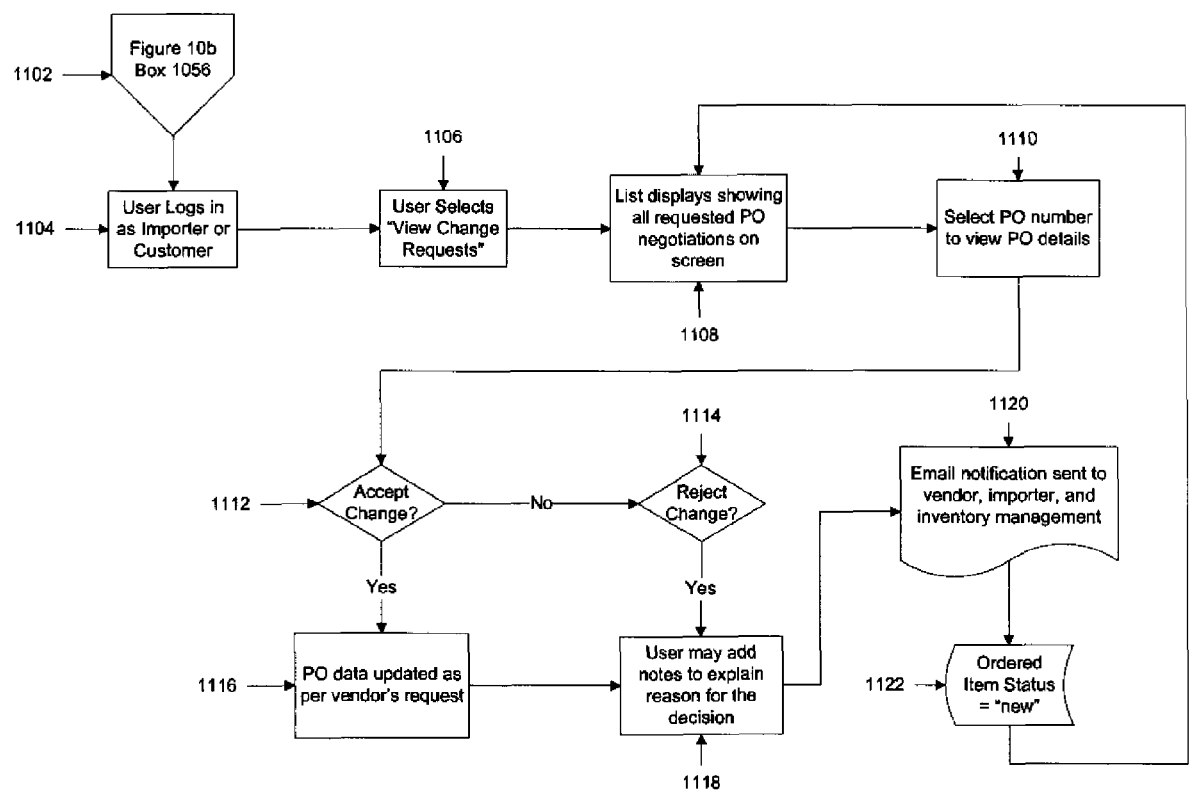
FIG. 11 is a flowchart illustrating the steps in reviewing and negotiating a purchase order, in accordance with the present invention.

However, if the vendor does not wish to cancel the purchase order, the system inquires as to whether the vendor would like to request a change (1030). If not, the vendor is taken back to step 1010. However, if the vendor/user has requested a change to the purchase order, he or she may revise the data they are asking for a change and also add in a mode of explanation (1032). After editing the order, the user may select to save the change (1034). If they do not wish to change the changes they are taken back to step 1032. However, if they do wish to save their change, the system determines if any data has been changed (1036). If not, there is no action. However, if there is, the ordered item status is now changed "negotiate" (1038). The customer inventory manager may login to review the change request (1040). The steps taken in FIG. 11 pertaining to purchase order negotiation review (1042) then take place.

Through purchase order negotiation review, the importer or customer may review all change requests received from vendors on a purchase order. After deciding to accept or reject a change, the purchase order data is updated and all interested parties are notified of the final decision. This begins with a request for a change that has been made in a purchase order (1102), which was made by the vendor in FIG. 10*b*, step 1042. The user logs in as a importer or customer (1104) to address this request for a change. The user selects "view change" from the purchase order menu (1106). A list of displays showing all requested purchase order negotiations are displayed on the screen (1108). The screen can be filtered by program and vendor. The user then selects a purchase order number to view the details of the change request (1110). The system asks whether the vendor or customer will accept the change (1112). If the user rejects the change (1114), the requested change data is cleared from the data base, and the user may add notes to explain the reason for the decision (1118). However, if the importer or customer accepts the change, the purchase data is updated as per the vendor's request (1116). And once again the importer or customer user may add notes to explain reason for the decision (1118). In any event an email notification is typically sent to the vendor, importer, and inventory management with details regarding the change (1120). The order item status is change to "new" (1122) and the change request is cleared from the screen and the user may continue to review by returning to step 1108, the list of all requested purchase order negotiations.

After completion of the negotiation, the system determines whether any "data" needs to be revised (1044). If not, the process is taken back to step 1010, however, if "data" does need to be revised the item status is changed to "requote" and the system scrolls back to step 256 (FIG. 2*b*). In another process, "cancelled item" will have been selected (1048), resulting in the user being moved to step 1026 of this flow chart.

With reference now to FIG. 10c, once the user has successfully completed confirmation of a purchase order as illustrated in FIG. 10b (1050), the purchase order confirmation form is displayed (1052). This is the first of six steps. The data displayed includes purchase order number, requested delivery, earliest ship date, latest ship date, distribution center, FOB quote, payment type, link to change payment type, current status, and purchase order notes (with the ability to add or review). The data grid typically lists each customer item number (containing a link to the quotation), vendor item number, description, master pack, case weight, case cube, FOB each, FOB per case, cases ordered, pieces ordered, extended cube, extended weight, extended FOB, and current status. For each item number, the user may select to confirm, cancel, or request a change (if the status is confirmed, the confirm and request change options are disabled). The summary will display the total number of cases ordered, the total carton cube, and the total FOB. Cancelled items are not included in the summary calculation. In the confirmed line item page, the user has selected the confirm or cancel every line in the purchase order. Once complete, the vendor may navigate to the next step. Typically, a warning message is displayed such as "purchase orders are not confirmed until you received a confirmation number" or the like.

After this, a purchase order confirmation form is displayed (1054), which is step 2 in order to confirm the carton marks. The vendor reviews the rules regarding carton marks, and checks the statements confirming the cartons will be marked as per the instructions. If the user does not check this field, they can not move forward.

The payment type is then determined (1056). If the user selects to be paid by letter of credit (LC), the user selects the manufacturer, beneficiary, and advising bank they wish use for this payment (1058). If the user selects the telegraphic transfer (TT) payment type, the user then selects the beneficiary they wish to use for this payment. If in any step of this process, the user selects to cancel, they start the process again at step 1, box 1060. A list of confirmed items is shown in a purchase order summary confirmation form (1062). The vendor checks to agree "I confirm the quotations listed above are complete and accurate". A listing of cancelled items shows with reasons for each. A link to the terms and conditions is shown, and the user must select a check box to agree "I accept the terms and conditions of this purchase order". The user then moves on to additional steps in the confirmation of the purchase order process in FIG. 10b (1064). Once the user has completed steps 1-4 and the purchase order confirmation process, as shown in FIG. 10c, (1066), a purchase order confirmation form is displayed (1068) which is the 5th step. This is similar to step 4, except the user may choose to step back, cancel, or confirm the order. If the user has selected to confirm the order (1070), the system checks whether all the items in the purchase order are confirmed or cancelled. If not, the system goes back to step 1 (1072) or box 1060 of FIG.10. However, if all the items are confirmed or cancelled, the systems checks whether all carton marks are confirmed (1074). If not, the user is taken back to step 1, box 1060. However, if so, the system checks whether the banking information page has been completed (1076). If not, the user is taken back to step 1, box 1060. However, if this information is complete, the systems checks whether all quotations are confirmed by the vendor as correct (1078). If not, the user is taken back to step 1 (box 1060), but if all quotes are confirmed as correct, the system checks whether all the terms and conditions have been accepted by the vendor (1080). If no, the user is taken back step 1 (box 1060). However, if these have been accepted the purchase order status is changed to "confirmed" (1082). The final step (step 6 of 6) is the purchase order confirmation form (1084), wherein the vendor views the confirmed purchase order data with the addition of a confirmation number and a message stating that the order has been confirmed and the page maybe printed or exported for the user's record. If the purchase order confirmation has been completed, the system navigates to transmit purchase order data to a freight folder, in accordance with FIG. 12 (1086).

With reference now to FIG. 12, everyday, any purchase orders which have been confirmed or revised are batched and processed into an electronic data interexchange (EDI) file which is then transmitted to the freight forwarder. EDI is a document exchange standard which allows trading partners (in this case, the importer and freight forwarder) to send and receive preformatted documents to one another and confirm receipt of all data. An incoming purchase order has already been received and processed through the steps illustrated in FIG. 10. The system performs an automated routine, comprising the steps illustrated FIG. 12, which may run once a day, but can be scheduled as per the customers requirements (1202). The system access the purchase orders detail table and begins with the first record in the database (1204). The system determines whether the purchase order line item status is "confirmed" (1206). If not, the system moves to the next record in the database (1208). However, if the item status is "confirmed", the confirmed purchase order line item data to the EDI (1210). Outgoing data depends on customer and freight forwarder requirements. The system then determines if this is the end of the record set (1212). If not, then the system moves to the next record in the database (1208). If so, the line item purchase order status is changed to "sent" for all purchase orders successfully transmitted in the outgoing file (1214). All electronic data files are then cleared of data (1216), and the purchase order data is transmitted to the freight forwarder in an outgoing EDI file (1218).

Figure 13:
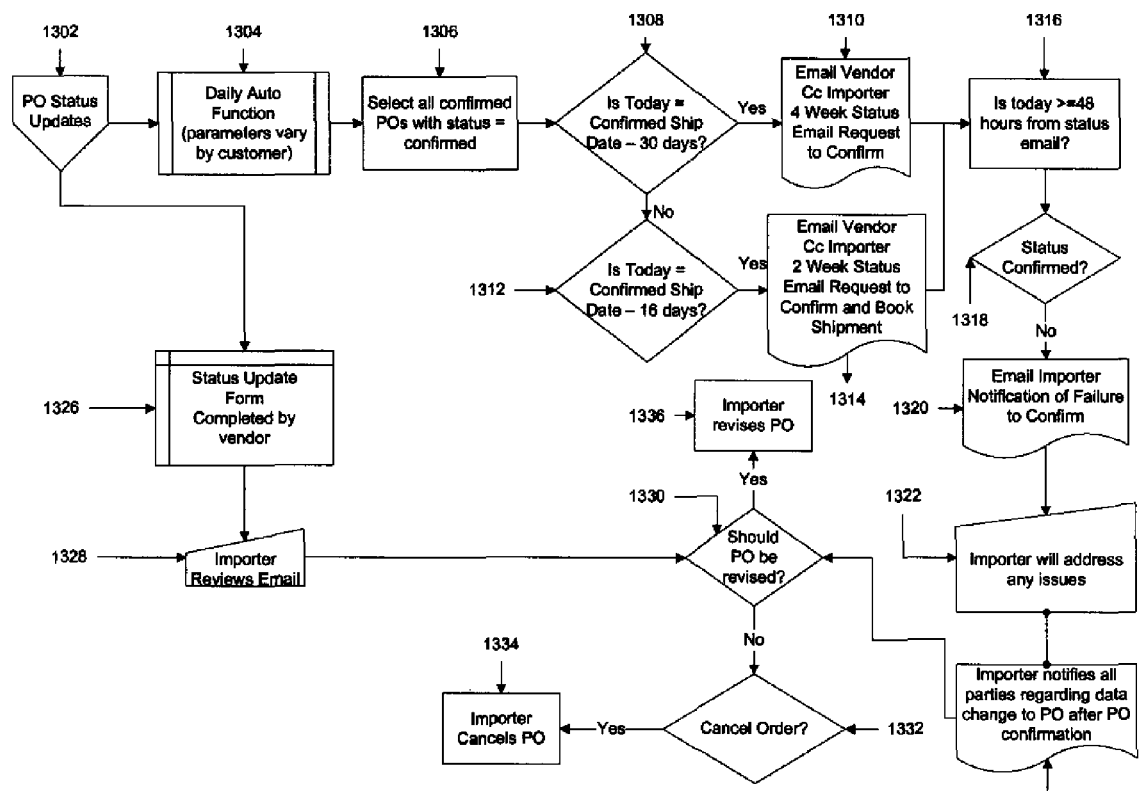
FIG. 13 is a flowchart depicting the steps for confirming shipping status, in accordance with the present invention.

With reference now to FIG. 13, there is a "black hole" in the import business, the time between when an order is confirmed and when it shipped. Typically, overseas vendors are not very diligent when it comes to notifying their customers of any production problems or delays with their orders. This presents serious drawbacks and consequences to the customer who maybe expecting seasonal items to arrive within a certain time frame. The method of the present invention automatically verifies shipping dates two and four weeks prior to shipment to allow the importer and the customers to make decisions on whether or not to keep an order and help us negotiate resolutions to problems early on, instead of at the back end when shipments are due to sail. Vendors are notified via email that they need to confirm their ship dates. Upon log in, vendor advises current status, and any issues are addressed by the importer. Upon failure to confirm ship dates, Importer is notified and can then work to address any issues.

Once the user has completed the purchase order confirmation process, the purchase order status updates process maybe undertaken (1302). Preferably, the system performs a daily automated function, the time and parameters can vary between customers. To begin the system will select all purchase orders with the status of "confirmed" (1306). The system then determines whether the particular day (today) is the confirmed shipment date minus thirty days (1308). If so, an email is sent to the vendor with a copy to the importer requesting confirmation of the ship date. If today is not the confirmed ship date minus thirty days, or rather is the confirmed ship date minus 16 days (or some other time period) (1313), then the vendor is emailed a two week status request to confirm and book the shipment (1314). The importer is automatically copied the message. The system eventually determines whether today is greater than or equal too forty-eight hours or some other designated time frame, from the status emails sent in step 1310 or 1314 (1316). The system then determines whether the status has been confirmed (1318). If yes, there is no action. However, if not, the system automatically generates an email to the importer notifying of the vendor's failure to confirm (1320). The importer can then address any issues (1322). The importer typically notifies all parties regarding the data change of the purchase order after the purchase order confirmation (1324). The importer determines whether the purchase order should be revised (1330). If so, the importer revises the purchase order (1336). If not, the importer decides whether the purchase order should be cancelled (1332), and if so the importer, most likely with input from customer, cancels the purchase order (1334).

As the system completes the daily automatic function of sending notification and checking for status updates, the vendor will also log in to the system to confirm status (1326). Upon log in, the vendor will see those orders they need to confirm status on. They can filter by program number, purchase order number, and ship date. The results of a filter produced a purchase order number with a link to the confirmation report as confirmed previously. For those orders requiring a four week confirmation, the system asks if the goods will ship as per the confirmation period. For those orders that require a two week confirmation, the system will ask if the goods will ship as scheduled and remind the vendor to book with the freight forwarder. If the user selects no for either update, they are required to explain the reasons for the delay. Once the status update form is completed, the user exits the system and the importer can review the emails sent from the vendor advises of a delay (1328). The importer, described above, then decides whether the purchase order should be revised (1330).

Figure 14:
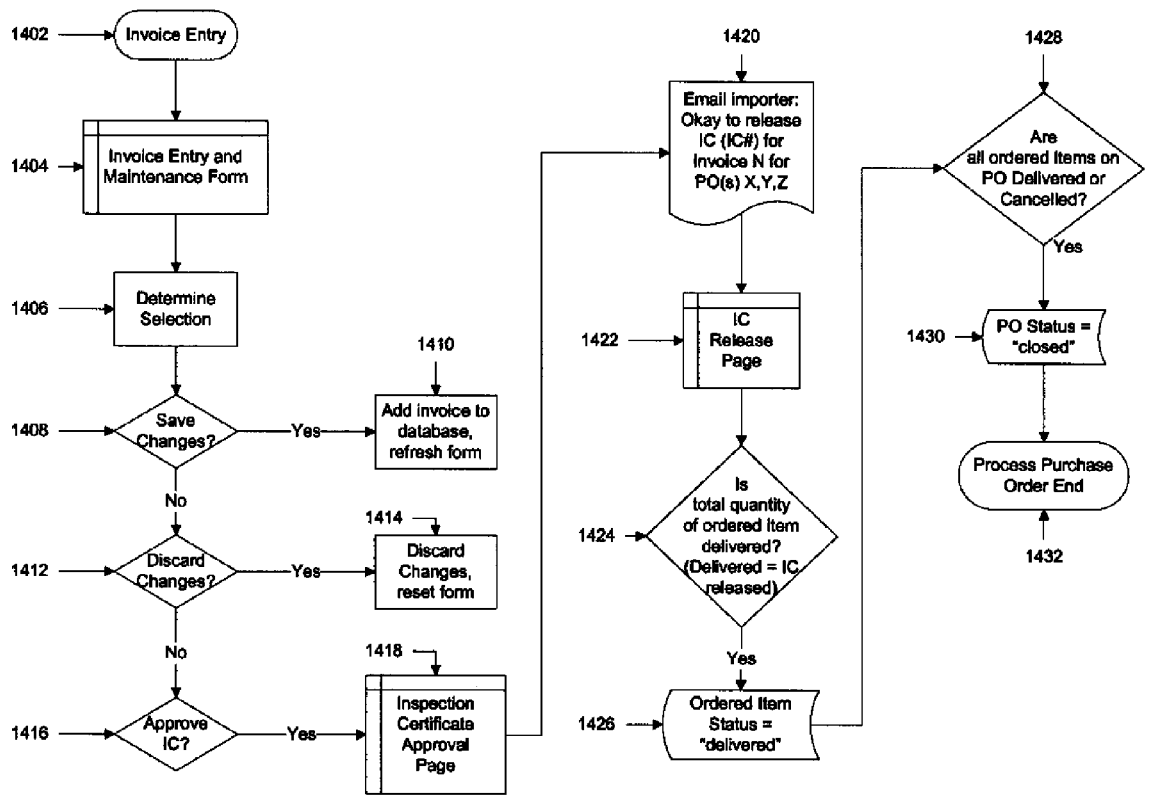
FIG. 14 is a flowchart depicting the steps taken to deliver product to the freight forwarder, in accordance with the present invention.

With reference now to FIG. 14, the steps taken during product delivery to the freight forwarder are illustrated. The importer is notified of shipment delivery to freight forwarder when the vendor's shipping documents are received. Upon receipt, the importer will enter invoice data into the system, document invoice numbers and carton quantities, allowing the accounting department to release payment to vendors and reconcile any issues which may come up regarding quantity and delivery of merchandise to the freight forwarder.

The process begins with the invoice entry (1402). The invoice entry indicates to the system that the importer's responsibility for the goods has ended and the vendor can now be paid. This system provides an invoice entry and maintenance form (1404). Invoice entry depends on the purchase orders which currently reside in the system. To begin the user will gather purchase order data by selecting the program, vendor, and distribution centers belonging to the invoice. They will enter the invoice number, container size, forwarder cargo receipt (FCR) number, vessel name, voyage, and flight number. The system will list the purchase order, item number, vendor's item number, description, unit cost, extended vendors cost, and the like. For each item the user will enter from the invoice the number of cartons, case weight, case cube, and actual ship date.

From the form, the system determines the selection (1406) and the user is given the option to save the changes (1408). If so, the invoice is added to the database and the form is refreshed (1410). However, if the user does not want to save the changes, the system asks if the user wants to discard the changes (1412). If so, the changes are discarded, and the form is reset (1414). The user is also allowed to select whether to approve the Inspection Certificate (IC) (1416). If so, the inspection approval page is displayed (1418). This is an automatically generated form listing today's date, inspection certificate number, "issued to", consignee, notifying party, invoice number, merchandise, TT or LC numbers, vessel name, or list date to depart from port of origin, legal statements, and a button where the user may select to approve the IC.

The inspection certificate is a document issued by an entity (typically in the system the present invention the importer) confirming that the documents have been inspected and are ready for submission to U.S. Customs. If a vendor submits incorrect shipping documents, the importer of record (typically the customer) is responsible for that incorrect data. Incorrect documents will not only result in charges in U.S. customs, but repeat offenders are subjected to more inspections at the docks when vessels arrive. Inspections always result in goods arriving late to their final destination, and the process of the present invention helps avoid these issues.

Once the inspection certificate has been approved, an email is generated to the importer, requesting whether it is okay release the inspection certificate for invoice and for purchase orders (1420). An inspection certificate release page is then displayed (1422). The page may filter all approved IC, that is all released or not yet released. An advanced filter may be used which will filter by inspection certificate number, purchase order number, program number, or vendor number, which results in a link printable to the inspection certificate form. Other displayed data include purchase order numbers, whether the inspection certificate or purchase order has been approved, the release inspection certificate, etc.

The system then determines whether the total quantity of ordered items has been delivered, or in other words the inspection certificate has been released (1424). If so, the ordered item status is changed to "delivered" (1426). If not, no action is taken. The system then determines whether all ordered items on the purchase order are delivered or cancelled (1428). If not, no action is taken however, if so, the purchase order status is changed to "closed" (1430). This ends the purchase order process (1432).

With reference now to FIG. 15, the process steps for handling vendor payments is shown. Import vendors are typically paid through either Letter of Credit (LC) or Telegraphic Transfer (TT, also known as a money wire). Through the system of the present invention, the importer accountant may set up the documentation required by the customer to process vendor payments. This includes purchase order details, total dollar amounts, and specific documents as required by the customer (e.g., a Wire Transfer Request (WTR) form or an LC cover letter). The documentation can be exported and e-mailed to customer's accounting department for payment reconciliation with the vendor. Based off of the vendor shipping invoice data entered, the importer accountant is able to track actual payments made to the vendor, and assist the customer's accountant with reconciliations at the close of a program.

Figure 15A:
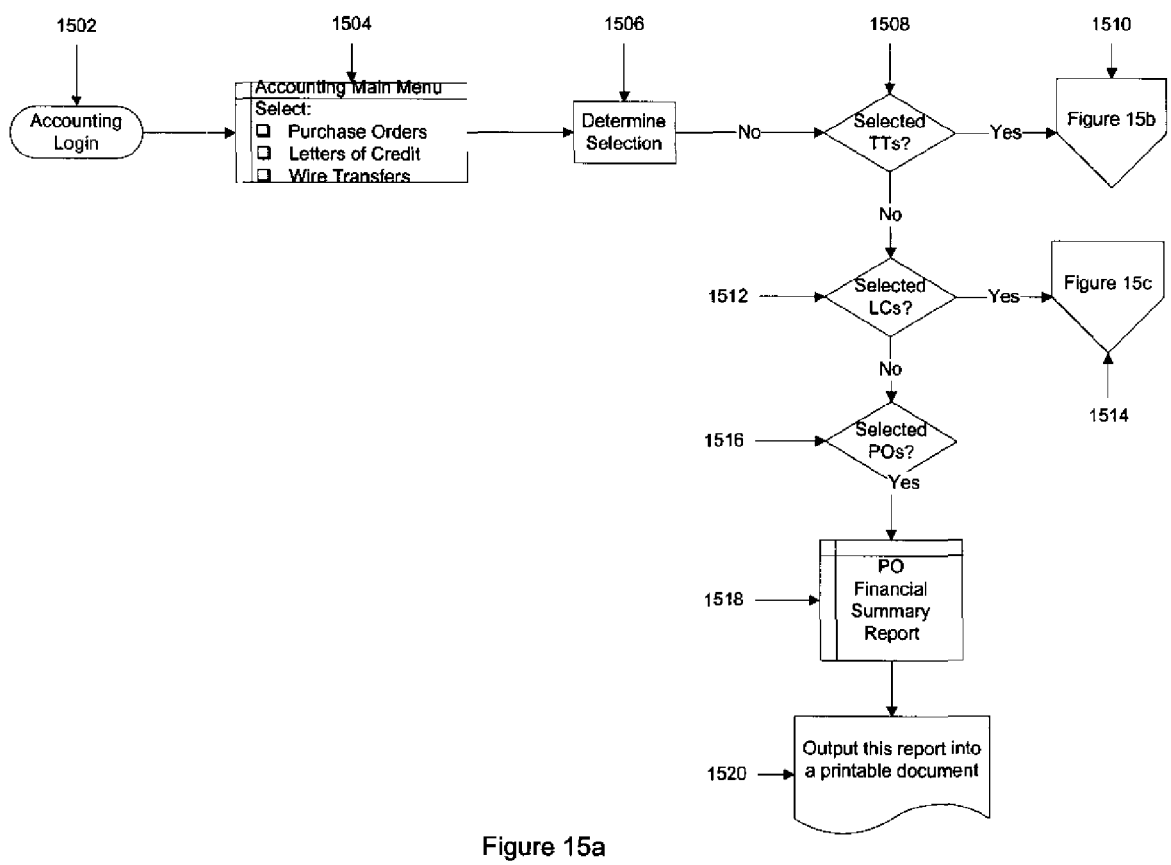
FIG. 15a-15c are flowcharts depicting the steps taken in processing vendor payments, in accordance with the present invention.
Figure 15B:
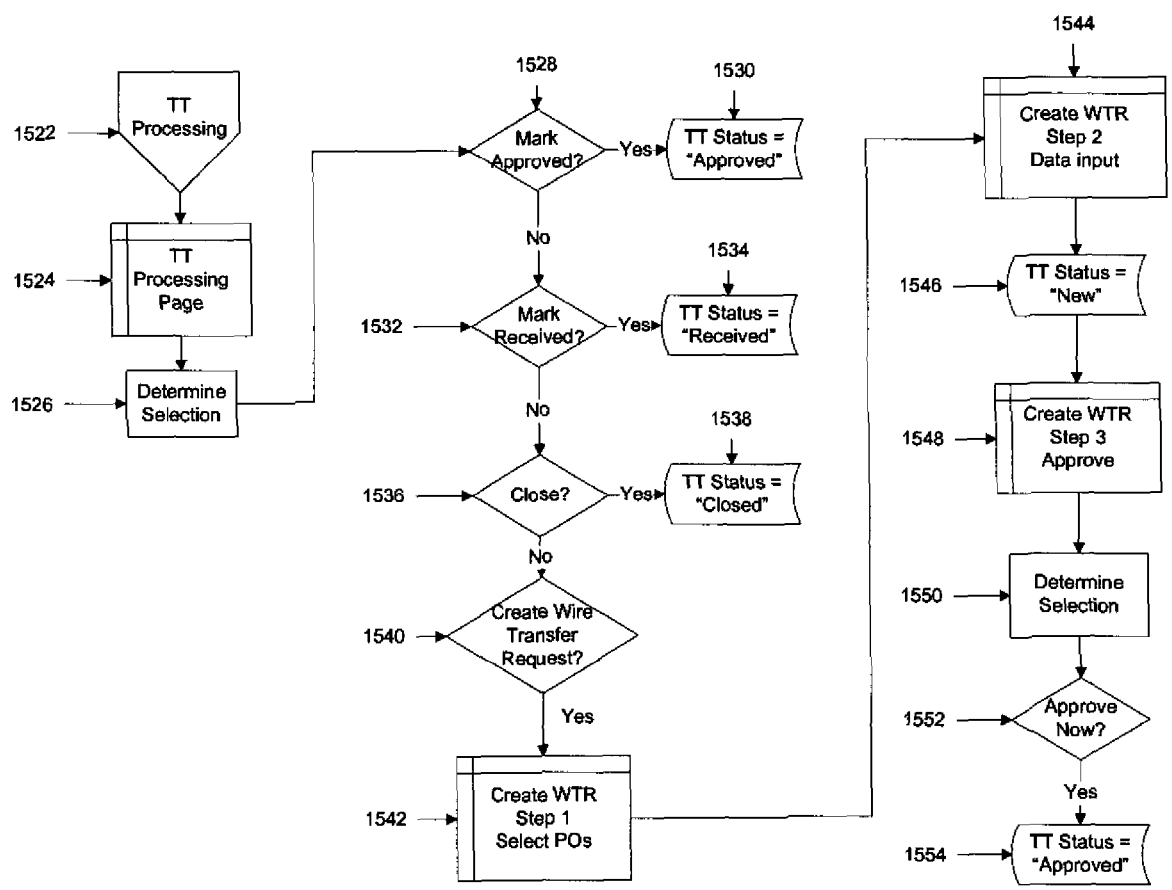

The process begins with an accounting login (1502). An accounting main menu is displayed (1504), in which the accountant selects purchase orders, letters of credit, or wire transfers. The system determines which selection has been made (1506), which may include selecting the telegraphic transfer (1508). If so, this process is illustrated in FIG. 15*b*. If not, but instead Letters of Credit is selected (1512), the process in FIG. 15*c* (1514) is followed. If the purchase orders are selected (1516), a purchase order financial summary report (1518) is generated. The user may select to filter this report, such as by purchase orders available for processing (purchase orders with a status of confirmed, but with no LC or TT number assigned), purchase orders pending processing but not available (purchase orders with a status of confirmed), processed purchase orders outstanding (purchase orders with an LC or TT number assigned, but the status being not "closed"), processed purchase orders closed (purchase orders with an LC or TT number assigned, that is status "closed"). In an advance filter, the user may be able filter by purchase order date, LC, TT or all. The advance filter may also filter by LC expiration date, ship dated, distribution center, category manager, purchase order number, program number, and vendor. The results of these filters and searches will show for each matching purchase order the payment type, preferably will also have a link to the LC or TT processing page (1510) and (1514), and a list of each purchase order number with a purchase order number containing a link to the purchase order confirmation report. Each purchase order will show the total dollar amount and total dollar amount outstanding. This summary will give a total for the report. The output of this report may be formatted into a printable document (1520).

With reference now to FIG. 15*b*, if the accountant selects Telegraphic Transfer, the TT processing begins (1522) by displaying a TT processing page (1524). This searches for existing telegraphic transfers, or may also create a new one. A TT is created for a vendor to include all orders in a program. Upon creation or review, the following data is displayed: PO number, total dollar amount, and a listing of each draw made against the TT. The user can select to add a draw and a total dollar amount of draws made against the TT display. In the summary, the total amount of all TT and the total outstanding amount is displayed. The user can select to mark a TT as approved or received, close the TT, and view or insert amendments. Step 1526 determines the selection. It is first determined whether the mark is approved (1528), and if so the TT status is changed to "approved" (1530). If not, the system asks whether the mark has been received (1532). If so, the TT status is changed to "received" (1534). However if the mark has not been received, the system asks if the TT status should be closed (1536). If the user selects yes, the TT status is "closed" (1538). However, if the user elects not to close the TT, the wire transfer request may be created (1540). If not, no action is taken. However, if the user selects to create a wire transfer, the first step of a wire transfer request (WTR) is under taken, which selects purchase orders, programs, and vendors (1542). This is completed by the importer. The system will show the purchase orders with the payment type which equals TT, or no TT number assigned, and the purchase order status equals "confirmed". The second step of the creation of the WTR includes data input (1544). This is completed by the importer, and the date of input varies by customer, but typically includes account information and purchase order total. The user may elect to save or cancel these changes. If saved, the TT status is changed to "new" (1546). The third step of the creation of the WTR is completed by the customer (1548). The date that is displayed varies by customer and for each line item the purchase order and the total dollar amount per order is displayed. A summary shows the total amount of the TT. The user selects to approve the TT and receives a message such as "Draws cannot be made against this WTR until request is marked received by customer". The system then determines the customer selection (1550), and asks if the customer would like to approve now (1552). If not, nothing is done. However, if the customer approves, the system changes the TT status to "approved" (1554).

Figure 15C:
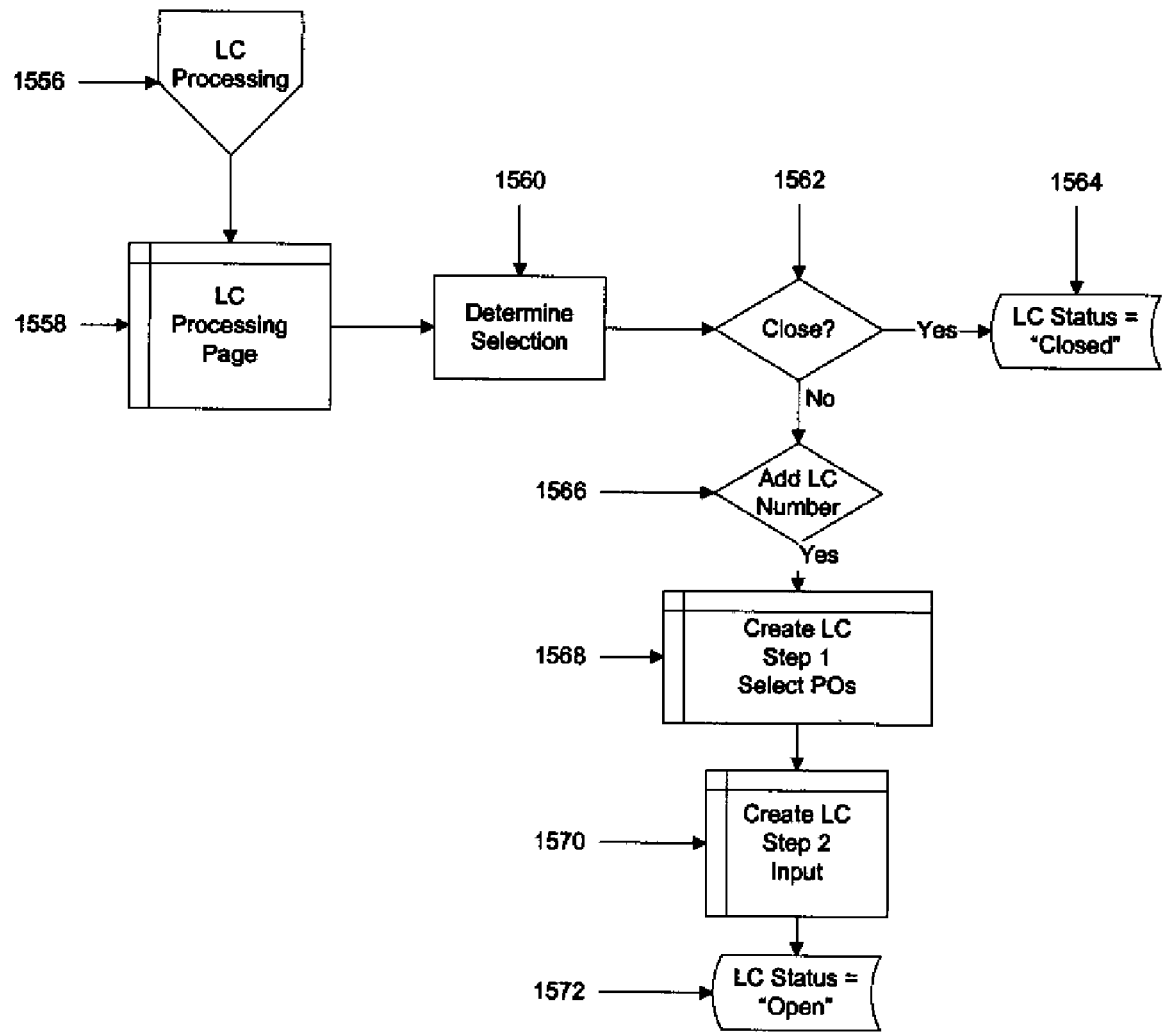

With reference now to FIG. 15*c*, the process steps of processing approving LC are shown. The LC processing (1556) begins with the display of an LC processing page (1558). In here, the user can search and filter by LC and PO numbers. The user has the option to add an LC number, as to be described more fully herein. Based on the search filter, the user will see the LC number, program number, expiration date, and purchase order numbers. Typically, the following data is shown per line item: purchase order number, total dollar amount for the purchase order, the amount drawn against the LC. This page, in summary, shows the total amount of the LC and the total outstanding amount. The user can select to close the LC. More particularly, with continued reference to FIG. 15*c*, the system determines the user's selection (1560). The system asks the user if it should close the LC (1562). If so, then the LC status is "closed" (1564). If not, the system asks whether an LC number should be added (1566). If not, no further action is taken. However, if the user desires to add an LC number, a form for creating an LC is displayed (1568), in which the user selects purchase orders, by picking a program and vendor. The system loads all purchase order numbers with the payment type equaling, all LC, no LC number assigned, and purchase order status being "confirmed". In the second step of the form, the user inputs the LC number (1570), the expiration date and any other data required by the customer. This page also shows the LC amounts (equals the sum of total extended FOB for all purchase orders). This page also lists each purchase order number with a link to the confirmation page, confirmation number, and the total extended FOB from the confirmation. The user then selects to create an LC number, and the LC status is changed to "open" (1572). The process steps in FIGS. 15*a*-15*c* are repeated until the vendors are properly paid by TT or LC by the customer and the program is closed.

It will be appreciated by those skilled in the art that the process of the present invention overcomes the disadvantages of the systems currently in place to handle supply chain transactions between customers and overseas vendors. The system automatically compares and checks the accuracy of inputted data, requires a minimum degree of information at critical steps, provides automated notices, and provides other functionality from the beginning of the process to the end of the process which is not currently available.

Although several embodiments have been described in detail for purposes of illustration, various modifications may be made without departing from the scope and spirit of the invention. Accordingly, the invention is not to be limited, except as by the appended claims.

What is claimed is:

1. A process for automating supply chain merchandise ordering and importation, comprising the steps of:

providing an on-line merchandise quotation, confirmation and tracking system;

a vendor creating a quotation for an item by adding quotation data to pre-established fields within the system;

the vendor approving, saving, and submitting the quotation data;

determining if all of the required quotation fields have been completed;

an importer logging into the on-line system and reviewing each quoted quotation of the vendor;

determining whether to change the vendor quotation, present the quotation to a customer without changes, or finalize the vendor quotation;

a customer logging into the on-line system and reviewing importer finalized or presented quotations for each vendor;

the customer determining whether to reject or accept the quotation, request a requote, pre-select a quotation, or select a quotation;

the customer creating a purchase order;

comparing data in purchase order to quotation data previously entered into the system to determine if discrepancies exist between the purchase order and the quotation data entered into the system, and if there are discrepancies between the purchase order and the quotation data pertaining to the item within the system, notifying the importer and/or the customer of the discrepancies;

storing the purchase order in the system;

notifying the vendor of the purchase order;

displaying a purchase order summary to the vendor;

the vendor confirming or canceling a purchase order;

forwarding the confirmed purchase order data to a freight forwarder;

periodically creating a purchase order status;

depending on the order status, determining if the purchase order should be revised, or cancelled;

notifying importer of shipment delivery to freight forwarder automatically when vendor's shipping documents are received by the system;

determining that total item quantity has been delivered; and the importer entering warehouse estimates.

2. The process of claim 1, including the step of the vendor registering with the system and supplying vendor contact data and vendor bank data.

3. The process of claim 1, wherein the creating a quotation step includes entering into the system item information, item packaging information, item shipping information, item duty schedule information, number of items per carton information, number of items minimum purchase information, single or assortment information, pricing information, and item graphic or photograph.

4. The process of claim 1, including the step of displaying the entered quotation data to the vendor for review.

5. The process of claim 1, including the step of changing the status of the quotation from unquoted to quoted after the vendor has approved and submitted the quotation.

6. The process of claim 1, including the step of displaying to the importer a plurality of programs and vendors with links to data for each.

7. The process of claim 1, including the step of the customer registering with the on-line system.

8. The process of claim 1, including the step of permitting the customer to add customer internal data, including advertisement data, for each quoted item.

9. The process of claim 1, including the step of the importer assigning each item a harmonized tariff schedule code.

10. The process of claim 9, including the step of the customer reviewing the assigned harmonized tariff schedule code, and accepting or assigning a new harmonized tariff schedule code and locking the assigned code from further adjustment.

11. The process of claim 1, including the step of displaying a summary of data entered into the system relating to a program associated with the item.

12. The process of claim 1, wherein the entering warehouse estimates step includes the step of estimating the quantity to be ordered per distribution center of the item.

13. The process of claim 1, including the step of the importer negotiating item price with the vendor after the quotation has been submitted.

14. The process of claim 1, including the step of assigning a purchase order number to the purchase order once the purchase order has been approved.

15. The process of claim 1, including the step of permitting the customer to review and revise the purchase order to eliminate detected discrepancies.

16. The process of claim 1, wherein the vendor confirming or canceling the purchase order step includes the steps of reviewing the purchase order for each item line by line, and confirming the purchase order, requesting a change to one or more lines of the purchase order, or canceling the ordered item.

17. The process of claim 16, wherein the confirming or canceling purchase order step further includes the steps of confirming carton marks, determining that all banking information is complete, and confirming that all quotes are correct.

18. The process of claim 16, wherein the requesting a change to one or more lines of a purchase order step includes the steps of notifying the importer and/or the customer of the requested change by the vendor, and the importer and/or customer accepting or rejecting the requested changes, and notifying the vendor, importer and customer of the acceptance or rejection of the changes.

19. The process of claim 1, including the step of calculating a ship date, and establishing at least one notification date relating to the calculated ship date.

20. The process of claim 19, including the steps of tracking the at least one notification date, and sending a query to the vendor on the at least one notification date requesting a status of the order and confirmation of shipping date.

21. The process of claim 20, including the step of notifying the importer in the event the vendor fails to send an order status within a maximum prescribed time.

22. The process of claim 1, including the step of the importer entering into the system invoice data, including the number of cartons, case weight, case cube, actual ship date, and approval or rejection of inspection certificate after the purchase order has been accepted by the vendor.

23. The process of claim 1, including the step of the importer creating and forwarding vendor payment documentation to the customer.

24. The process of claim 23, wherein the vendor payment documentation includes purchase order data, total dollar amounts, and a wire transfer request form or a letters credit cover letter.

25. The process of claim 23, including the step of tracking actual payments made to the vendor.

26. A process for automating supply chain merchandise ordering and importation, comprising the steps of:

providing an on-line merchandise quotation, confirmation and tracking system;

a vendor creating a quotation for an item by adding quotation data to pre-established fields within the system;

the vendor approving, saving, and submitting the quotation data;

determining if all of the required quotation fields have been completed;

an importer logging into the on-line system and reviewing each quoted quotation of the vendor;

determining whether to change the vendor quotation, present the quotation to a customer without changes, or finalize the vendor quotation;

a customer logging into the on-line system and reviewing importer finalized or presented quotations for each vendor;

the customer determining whether to reject or accept the quotation, request a requote, pre-select a quotation, or select a quotation;

the customer creating a purchase order;

comparing data in purchase order to quotation data previously entered into the system to determine if discrepancies exist between the purchase order and the quotation data entered into the system, and if there are discrepancies between the purchase order and the quotation data pertaining to the item within the system, notifying the importer and/or the customer of the discrepancies;

storing the purchase order in the system;

notifying the vendor of the purchase order;

displaying a purchase order summary to the vendor;

the vendor confirming or canceling a purchase order;

forwarding the confirmed purchase order data to a freight forwarder;

periodically creating a purchase order status;

depending on the order status, determining if the purchase order should be revised, or cancelled;

notifying importer of shipment delivery to freight forwarder automatically when vendor's shipping documents are received by the system;

determining that total item quantity has been delivered; and wherein the vendor confirming or canceling the purchase order step includes the steps of reviewing the purchase order for each item line by line, and confirming the purchase order, requesting a change to one or more lines of the purchase order, or canceling the ordered item; and wherein the confirming or canceling purchase order step further includes the steps of confirming carton marks, determining that all banking information is complete, and confirming that all quotes are correct.

27. The process of claim 26, including the step of the vendor registering with the system and supplying vendor contact data and vendor bank data.

28. The process of claim 26, wherein the creating a quotation step includes entering into the system item information, item packaging information, item shipping information, item duty schedule information, number of items per carton information, number of items minimum purchase information, single or assortment information, pricing information, and item graphic or photograph.

29. The process of claim 26, including the step of displaying the entered quotation data to the vendor for review.

30. The process of claim 26, including the step of changing the status of the quotation from unquoted to quoted after the vendor has approved and submitted the quotation.

31. The process of claim 26, including the step of displaying to the importer a plurality of programs and vendors with links to data for each.

32. The process of claim 26, including the step of the customer registering with the on-line system.

33. The process of claim 26, including the step of permitting the customer to add customer internal data, including advertisement data, for each quoted item.

34. The process of claim 26, including the step of the importer assigning each item a harmonized tariff schedule code.

35. The process of claim 34, including the step of the customer reviewing the assigned harmonized tariff schedule code, and accepting or assigning a new harmonized tariff schedule code and locking the assigned code from further adjustment.

36. The process of claim 26, including the step of displaying a summary of data entered into the system relating to a program associated with the item.

37. The process of claim 26, including the step of the importer entering warehouse estimates.

38. The process of claim 37, wherein the entering warehouse estimates step includes the step of estimating the quantity to be ordered per distribution center of the item.

39. The process of claim 26, including the step of the importer negotiating item price with the vendor after the quotation has been submitted.

40. The process of claim 26, including the step of assigning a purchase order number to the purchase order once the purchase order has been approved.

41. The process of claim 26, including the step of permitting the customer to review and revise the purchase order to eliminate detected discrepancies.

42. The process of claim 41, wherein the requesting a change to one or more lines of a purchase order step includes the steps of notifying the importer and/or the customer of the requested change by the vendor, and the importer and/or customer accepting or rejecting the requested changes, and notifying the vendor, importer and customer of the acceptance or rejection of the changes.

43. The process of claim 26, including the step of calculating a ship date, and establishing at least one notification date relating to the calculated ship date.

44. The process of claim 43, including the steps of tracking the at least one notification date, and sending a query to the vendor on the at least one notification date requesting a status of the order and confirmation of shipping date.

45. The process of claim 44, including the step of notifying the importer in the event the vendor fails to send an order status within a maximum prescribed time.

46. The process of claim 26, including the step of the importer entering into the system invoice data, including the number of cartons, case weight, case cube, actual ship date, and approval or rejection of inspection certificate after the purchase order has been accepted by the vendor.

47. The process of claim 26, including the step of the importer creating and forwarding vendor payment documentation to the customer.

48. The process of claim 47, wherein the vendor payment documentation includes purchase order data, total dollar amounts, and a wire transfer request form or a letters credit cover letter.

49. The process of claim 47, including the step of tracking actual payments made to the vendor.

* * * * *